(12) United States Patent
Rokkjaer

(10) Patent No.: US 6,920,893 B2
(45) Date of Patent: *Jul. 26, 2005

(54) CORROSIVE RESISTANT LIQUID EXTRACTION APPARATUS

(76) Inventor: Henrik Rokkjaer, 19791 Bahama St., Northridge, CA (US) 91324

( * ) Notice: Subject to any disclaimer, the term of this patent is extended or adjusted under 35 U.S.C. 154(b) by 382 days.

This patent is subject to a terminal disclaimer.

(21) Appl. No.: 10/193,365

(22) Filed: Jul. 9, 2002

(65) Prior Publication Data

US 2002/0179157 A1 Dec. 5, 2002

Related U.S. Application Data

(63) Continuation-in-part of application No. 09/827,070, filed on Apr. 4, 2001, now Pat. No. 6,644,340.

(51) Int. Cl.$^7$ ................ F16L 37/248; F16L 37/252; F16L 55/07
(52) U.S. Cl. ................ 137/322; 137/212; 137/320; 220/293; 220/303; 222/400.7
(58) Field of Search ................ 137/212, 320, 137/321, 322; 220/293, 303; 222/400.7

(56) References Cited

U.S. PATENT DOCUMENTS

| | | | | |
|---|---|---|---|---|
| 3,473,556 A | * | 10/1969 | Marine et al. | 137/322 |
| 3,494,373 A | * | 2/1970 | Horak et al. | 137/217 |
| 3,596,810 A | * | 8/1971 | Taubenheim | 222/400.7 |
| 3,687,340 A | * | 8/1972 | DeLaHunt | 222/400.7 |
| 4,180,189 A | * | 12/1979 | Zurit et al. | 222/400.7 |
| 4,350,273 A | * | 9/1982 | Nezworski et al. | 222/400.7 |
| 4,411,287 A | * | 10/1983 | Hyde | 137/315.04 |
| 5,901,747 A | * | 5/1999 | Rokkjaer | 137/322 |
| 5,944,229 A | * | 8/1999 | Rokkjaer | 222/400.7 |
| 6,196,522 B1 | * | 3/2001 | Yuen et al. | 251/149.5 |

* cited by examiner

Primary Examiner—Kevin Lee

(57) ABSTRACT

A liquid transfer system that includes a valve and a coupler assembly of unique design for use in extracting hazardous fluids from a transport container. The system includes a novel valve and coupler assembly that is of a simple design and is uniquely constructed from a corrosive resistant plastic that is substantially impervious to most corrosive liquids.

20 Claims, 20 Drawing Sheets

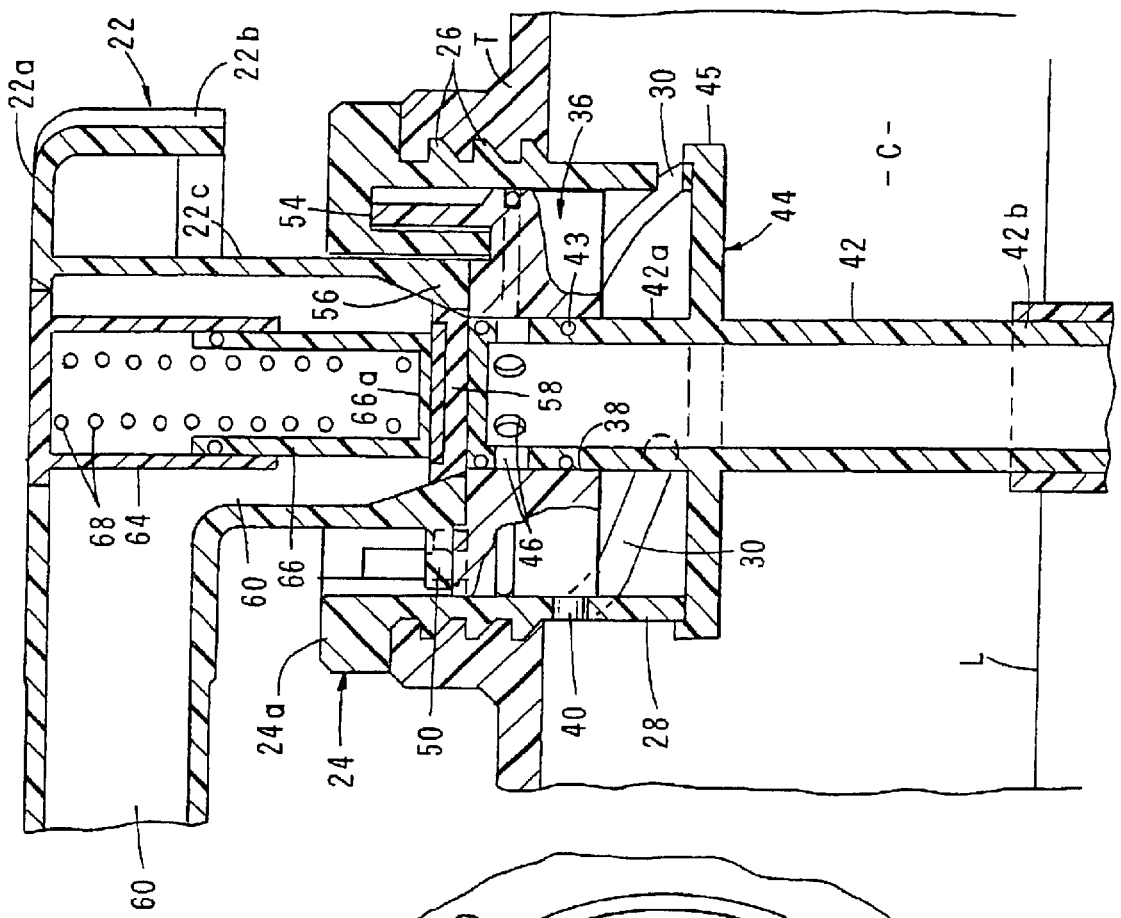

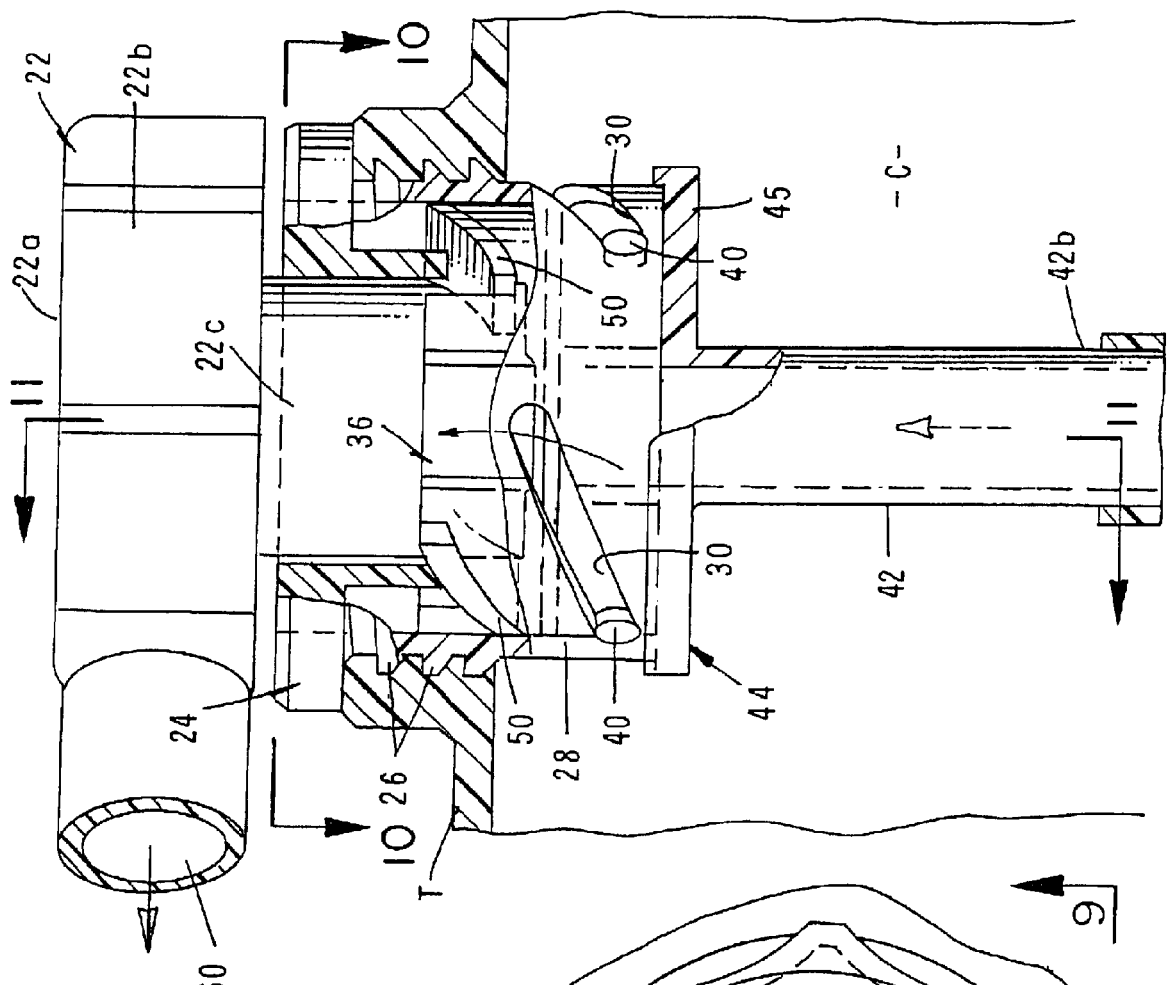
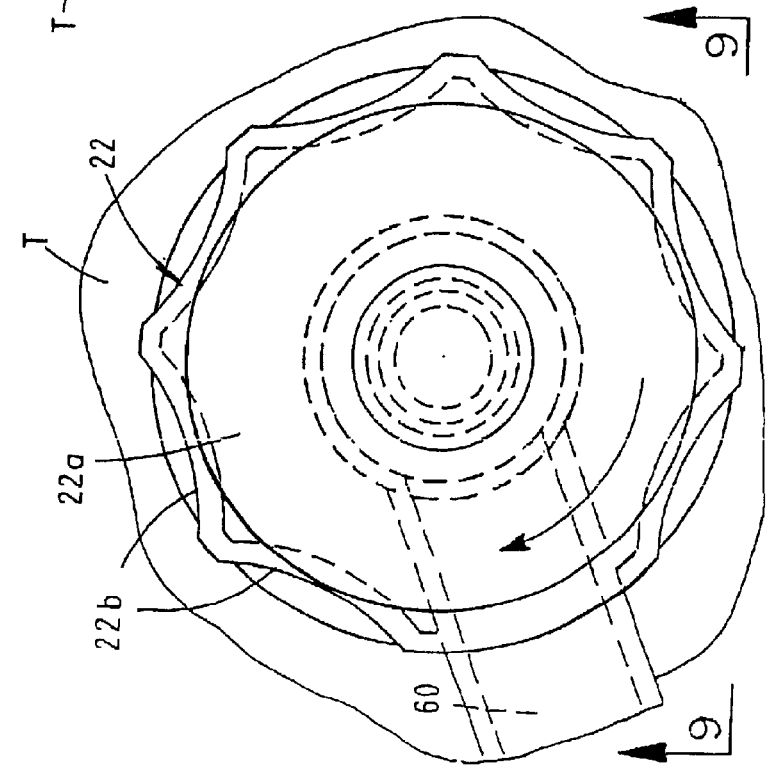
FIG. 9
FIG. 8

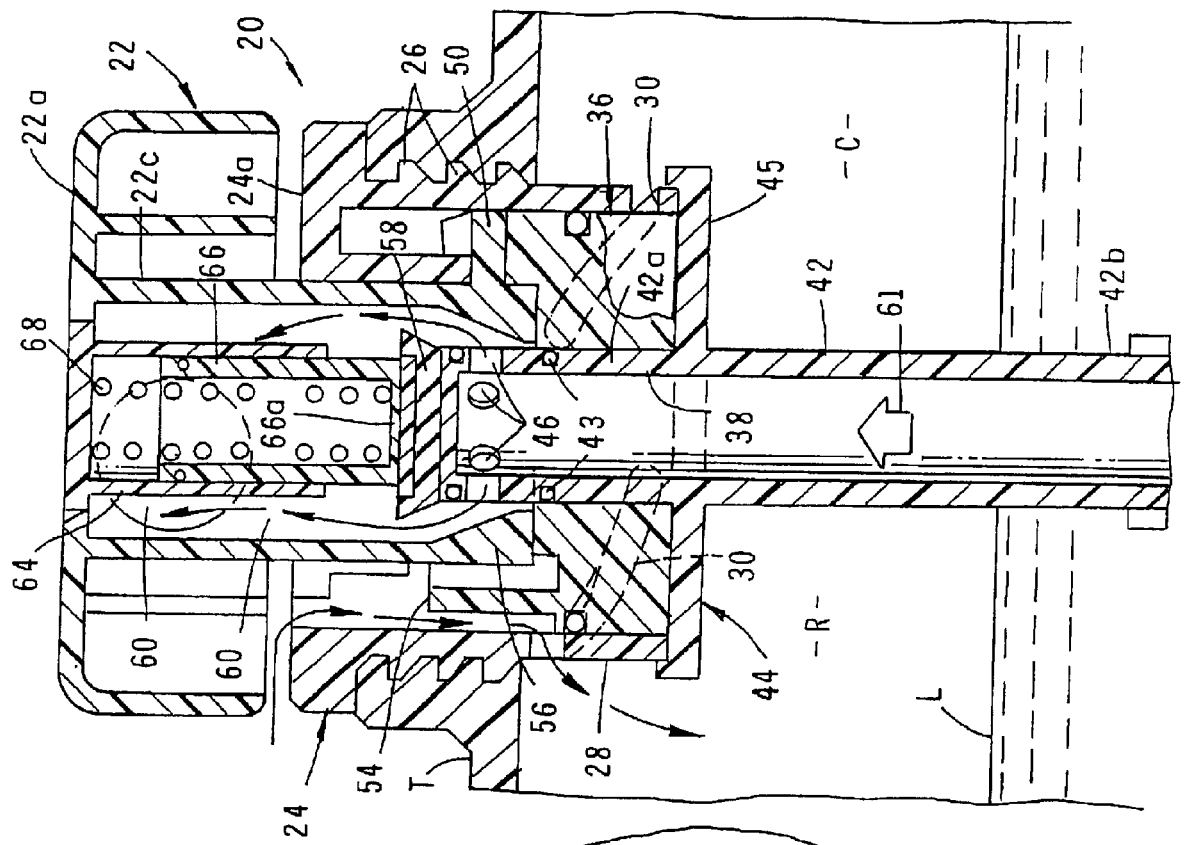
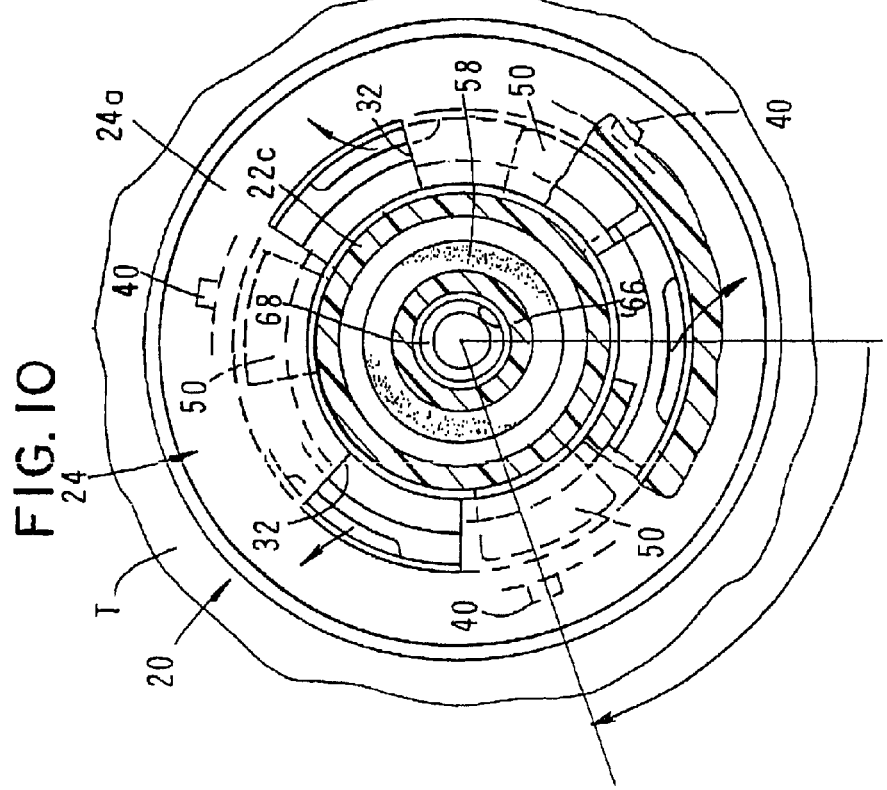

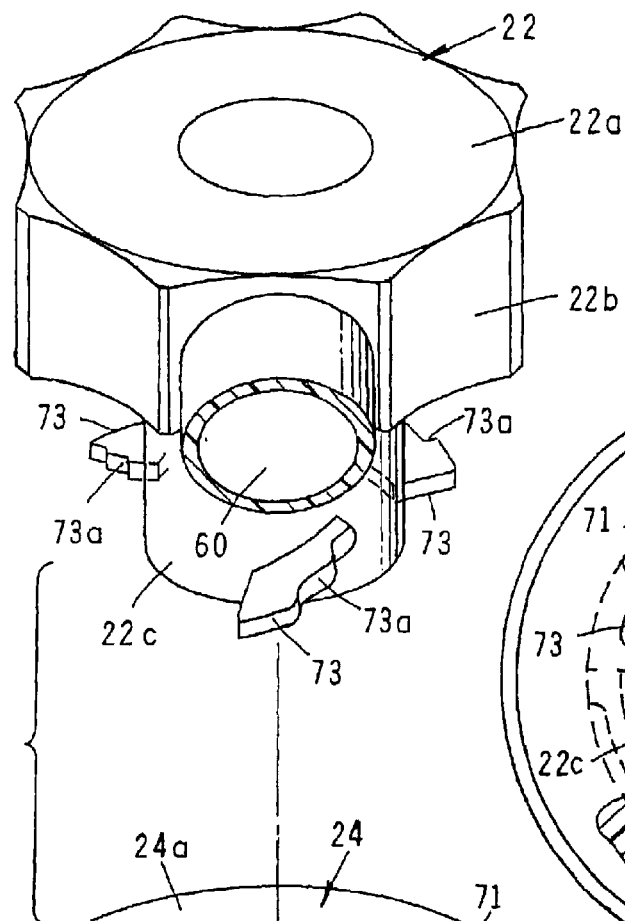
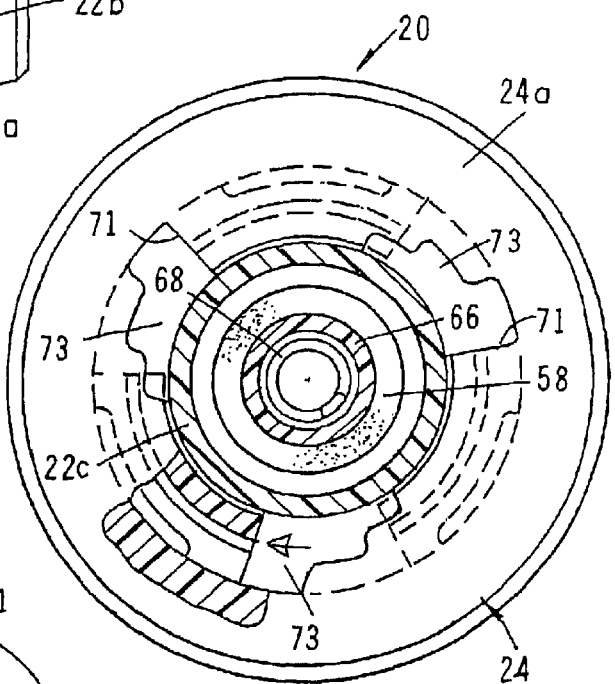
FIG. 13
FIG. 14

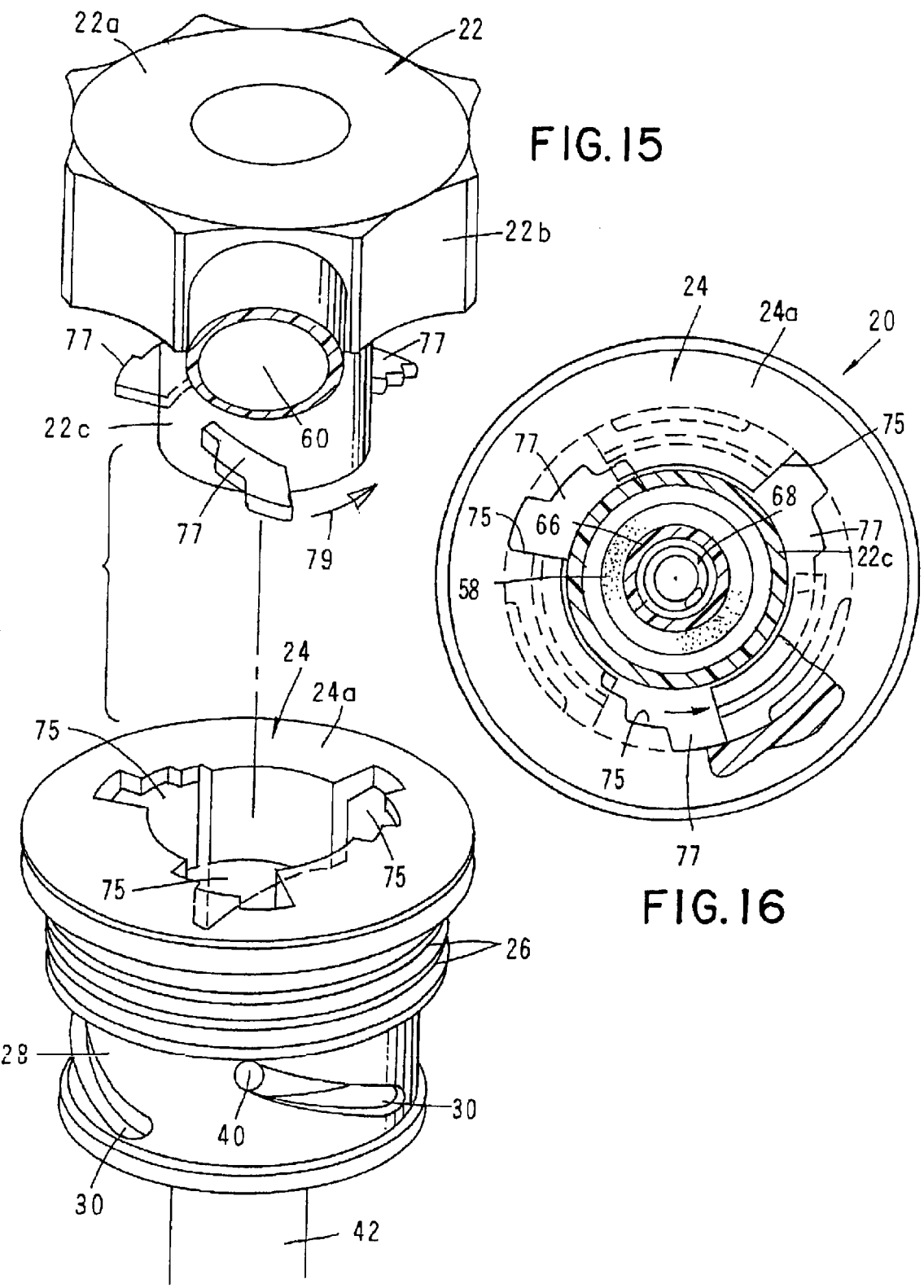

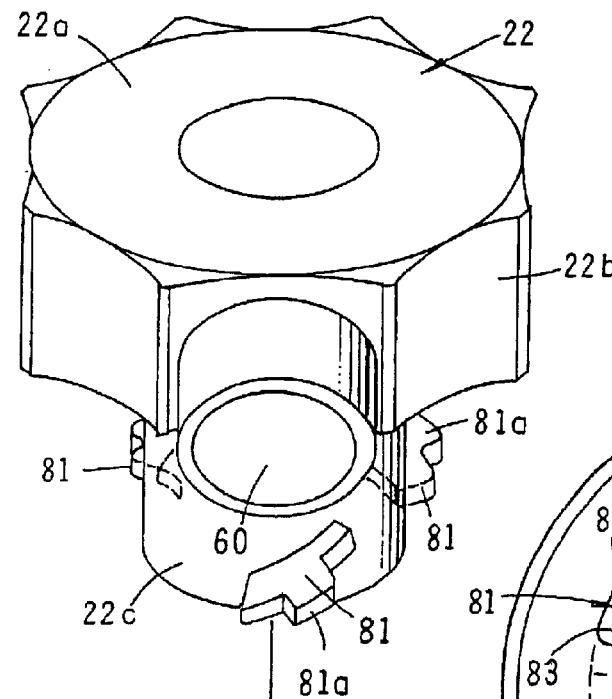
FIG. 17
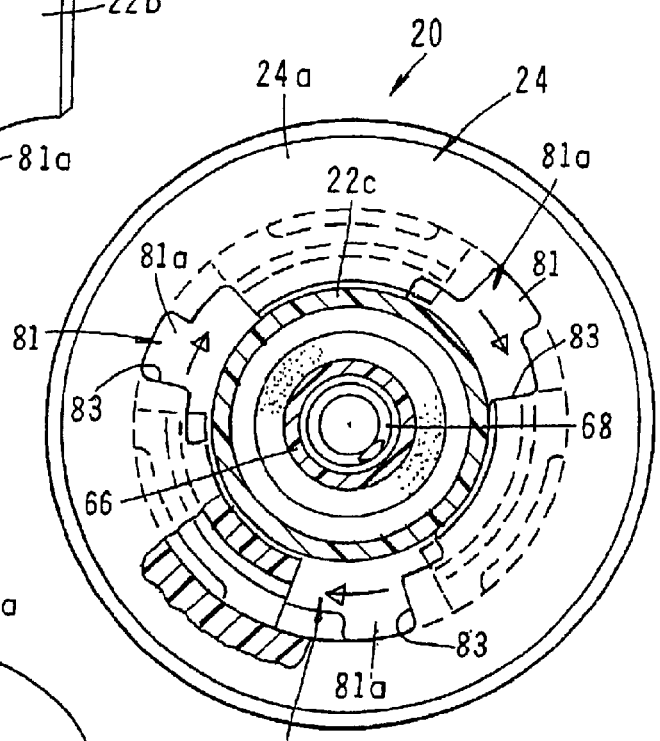
FIG. 18
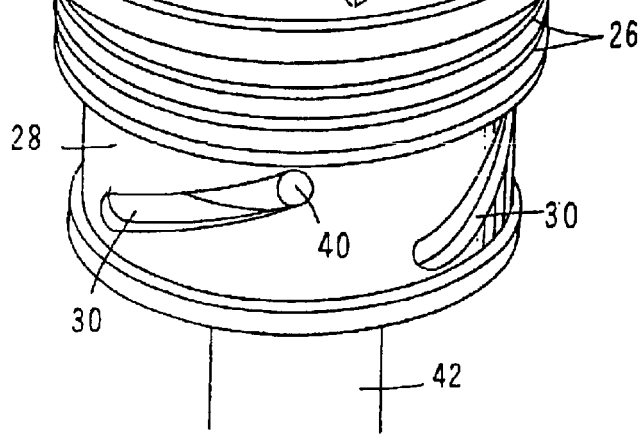

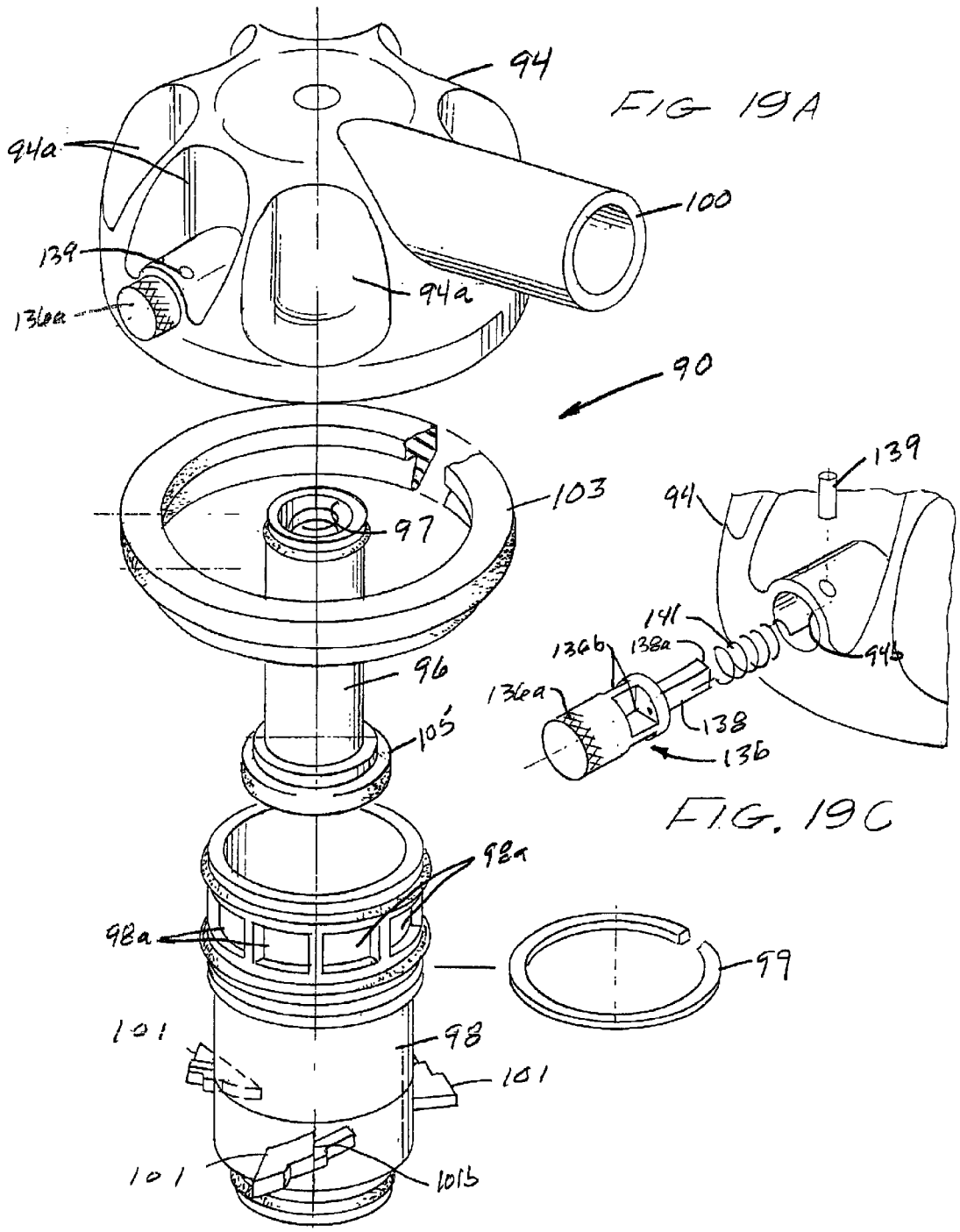

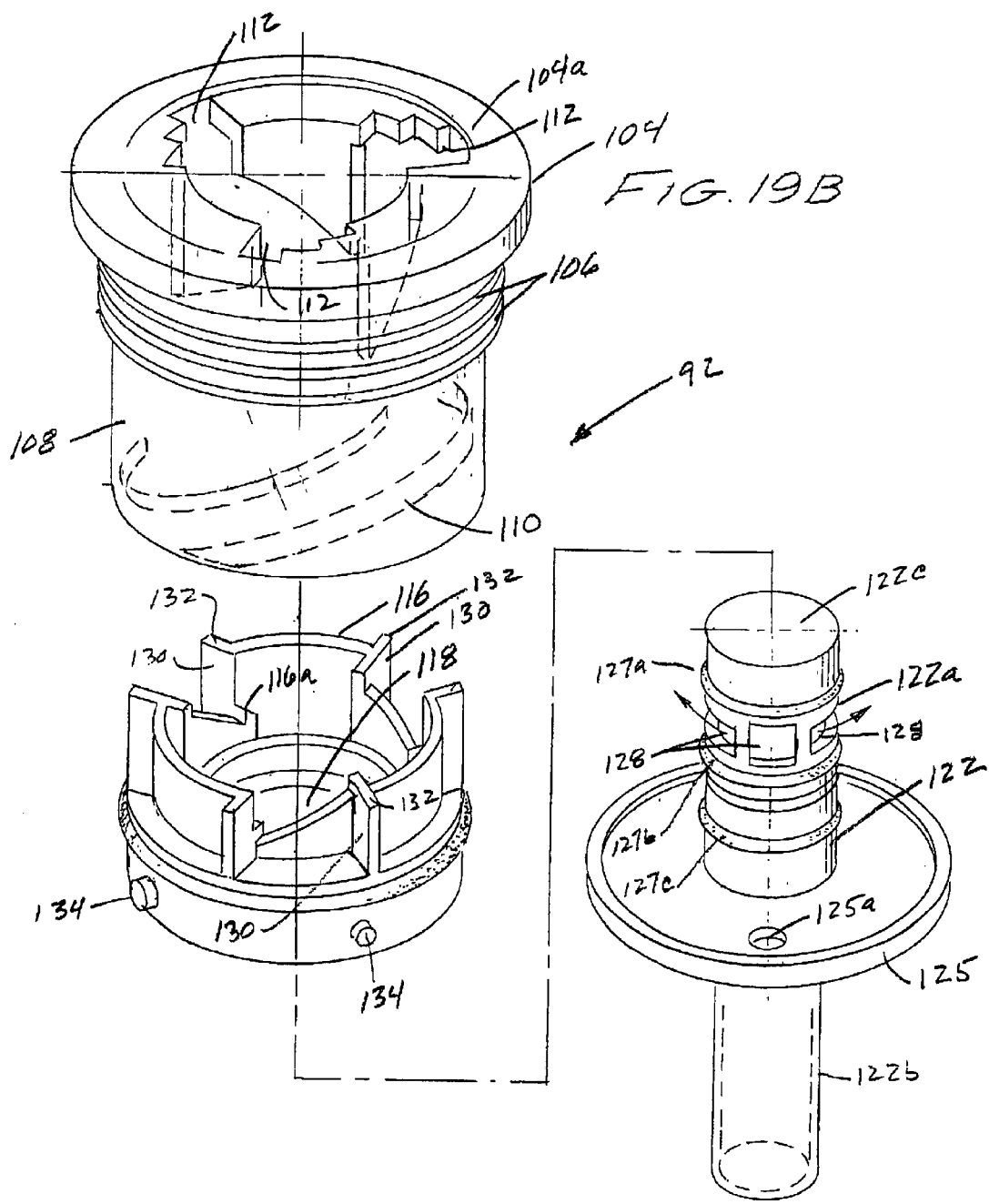

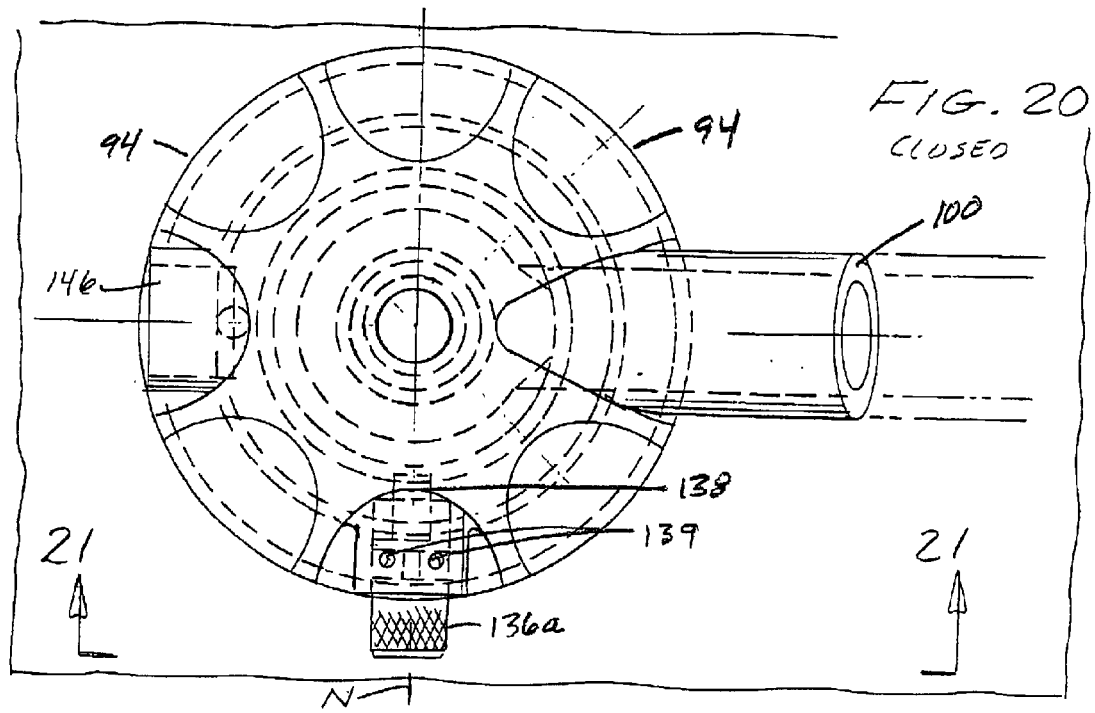
FIG. 20 CLOSED
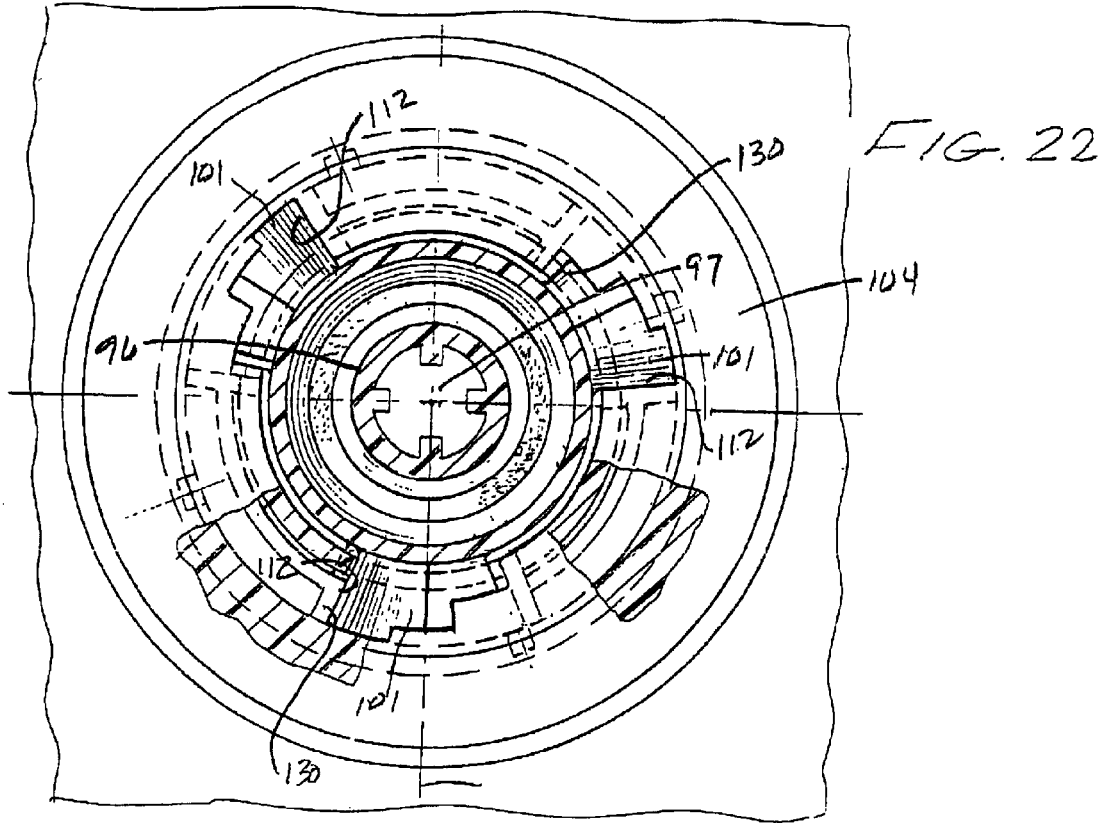
FIG. 22

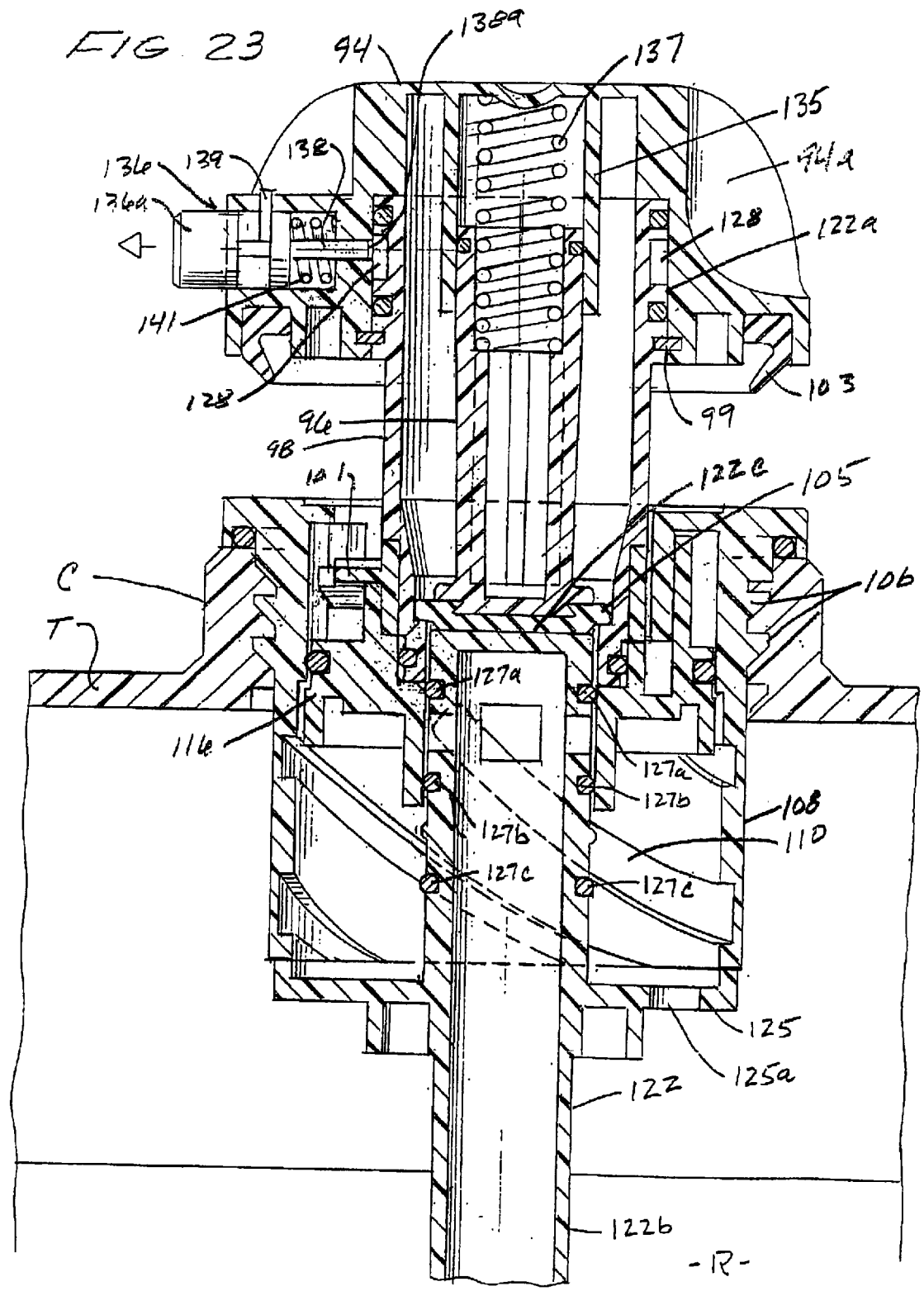

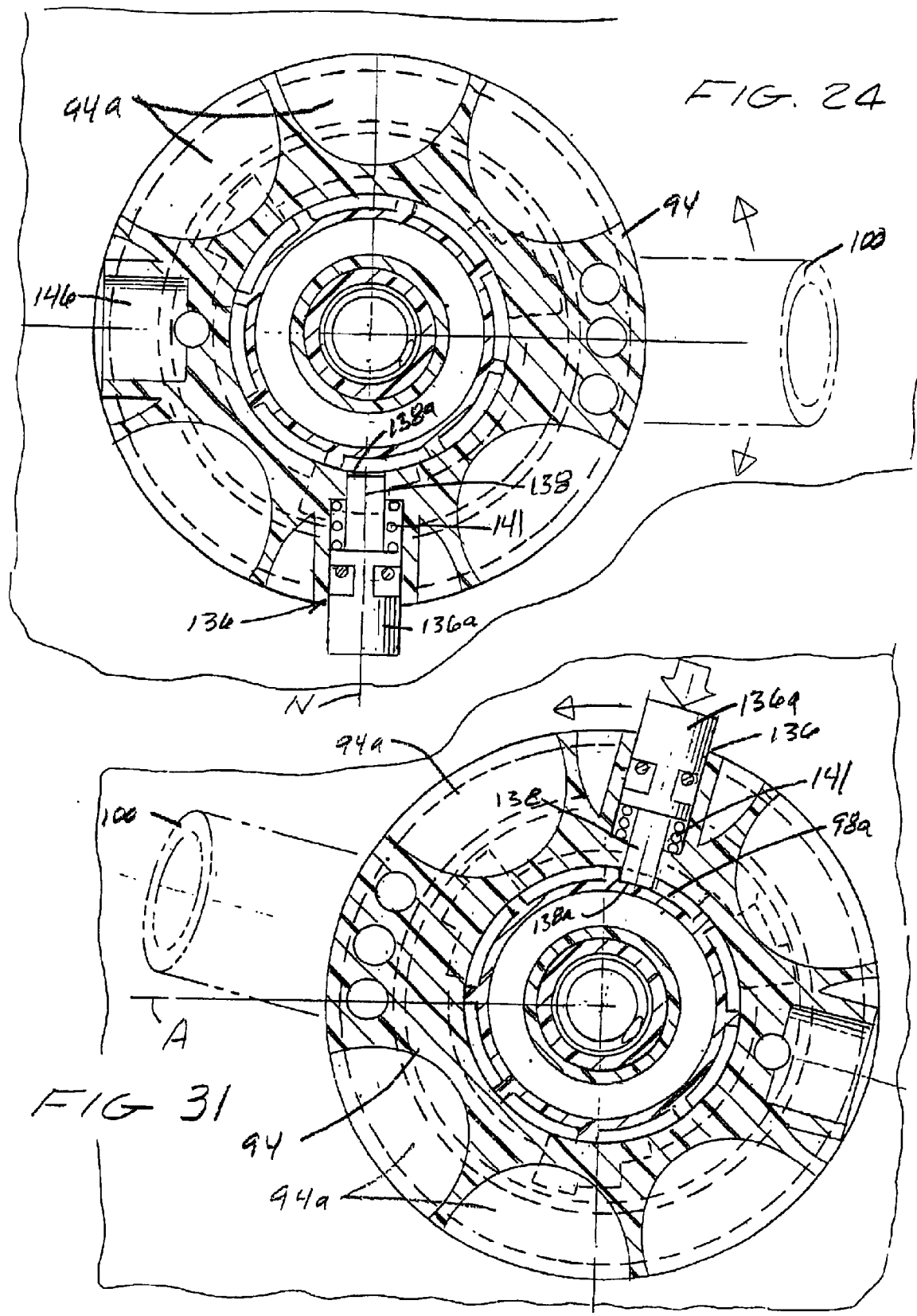

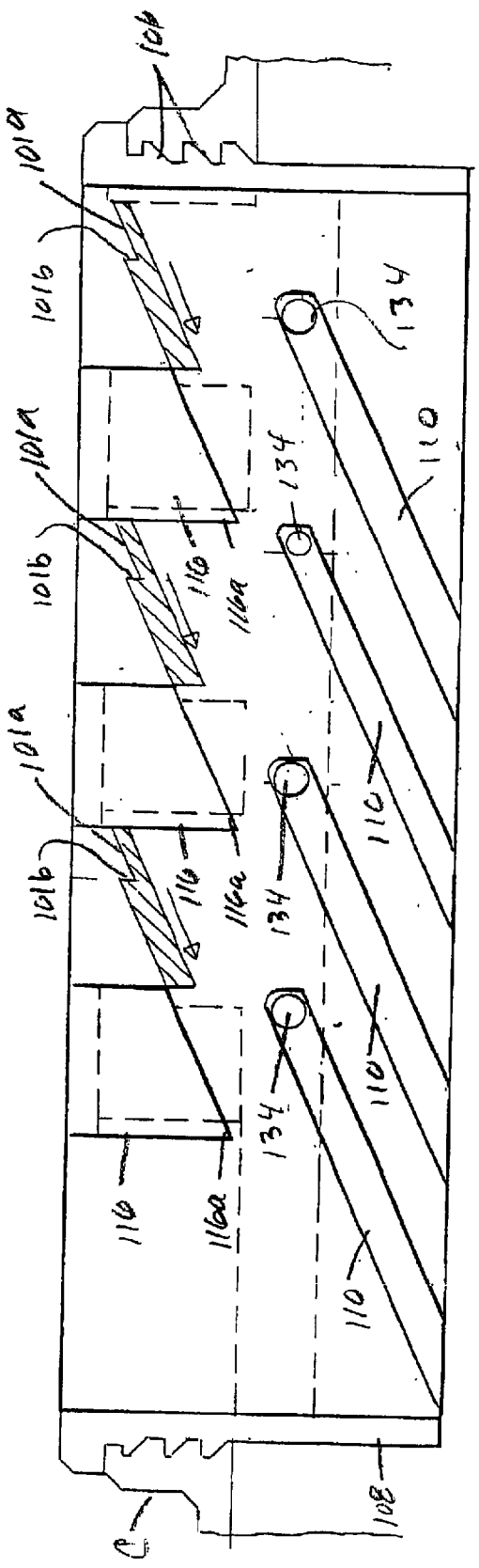
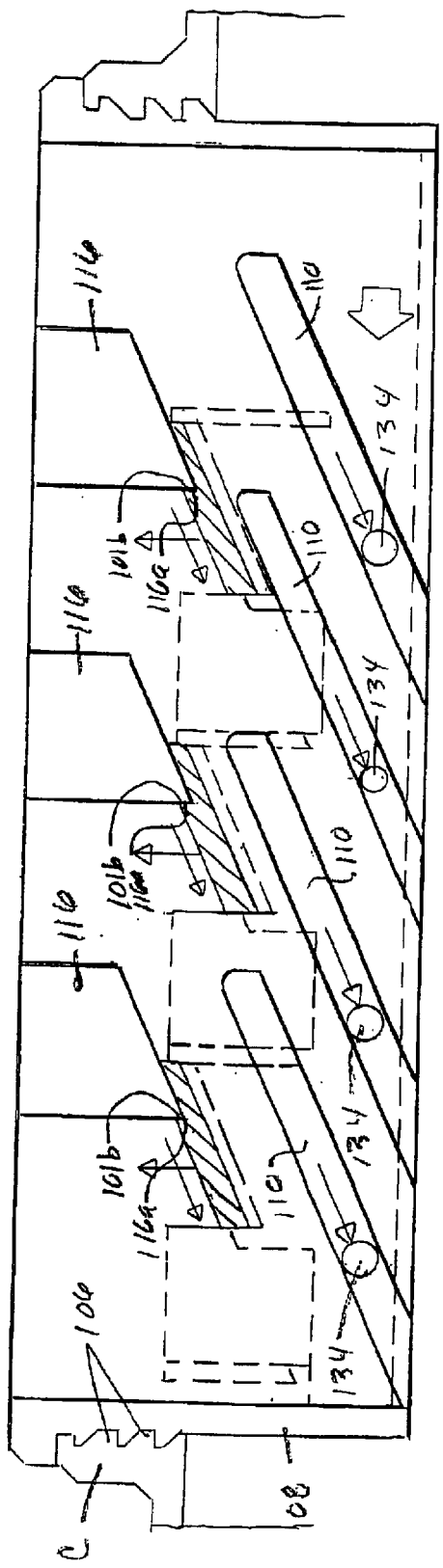
FIG 25
FIG 30

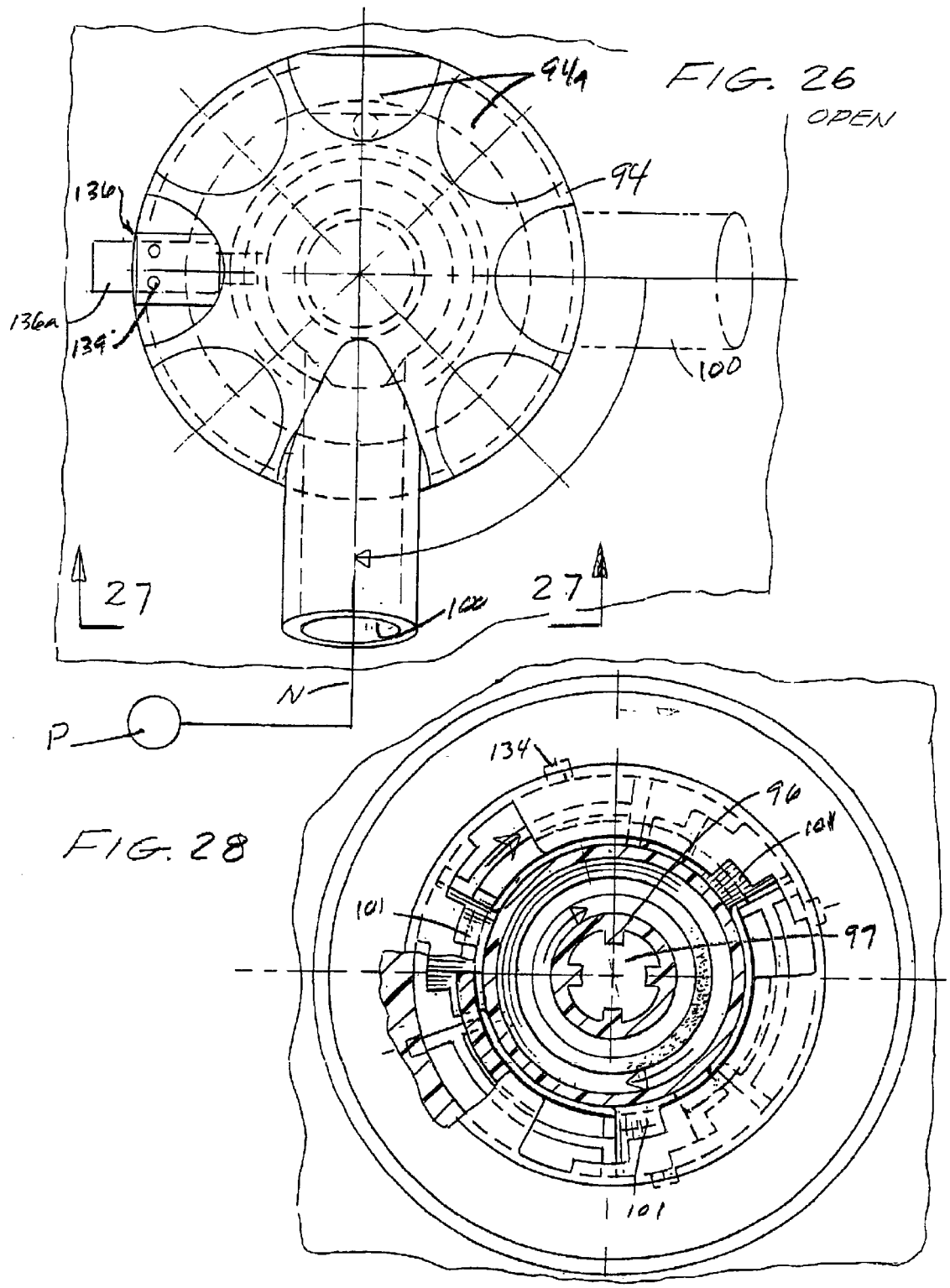

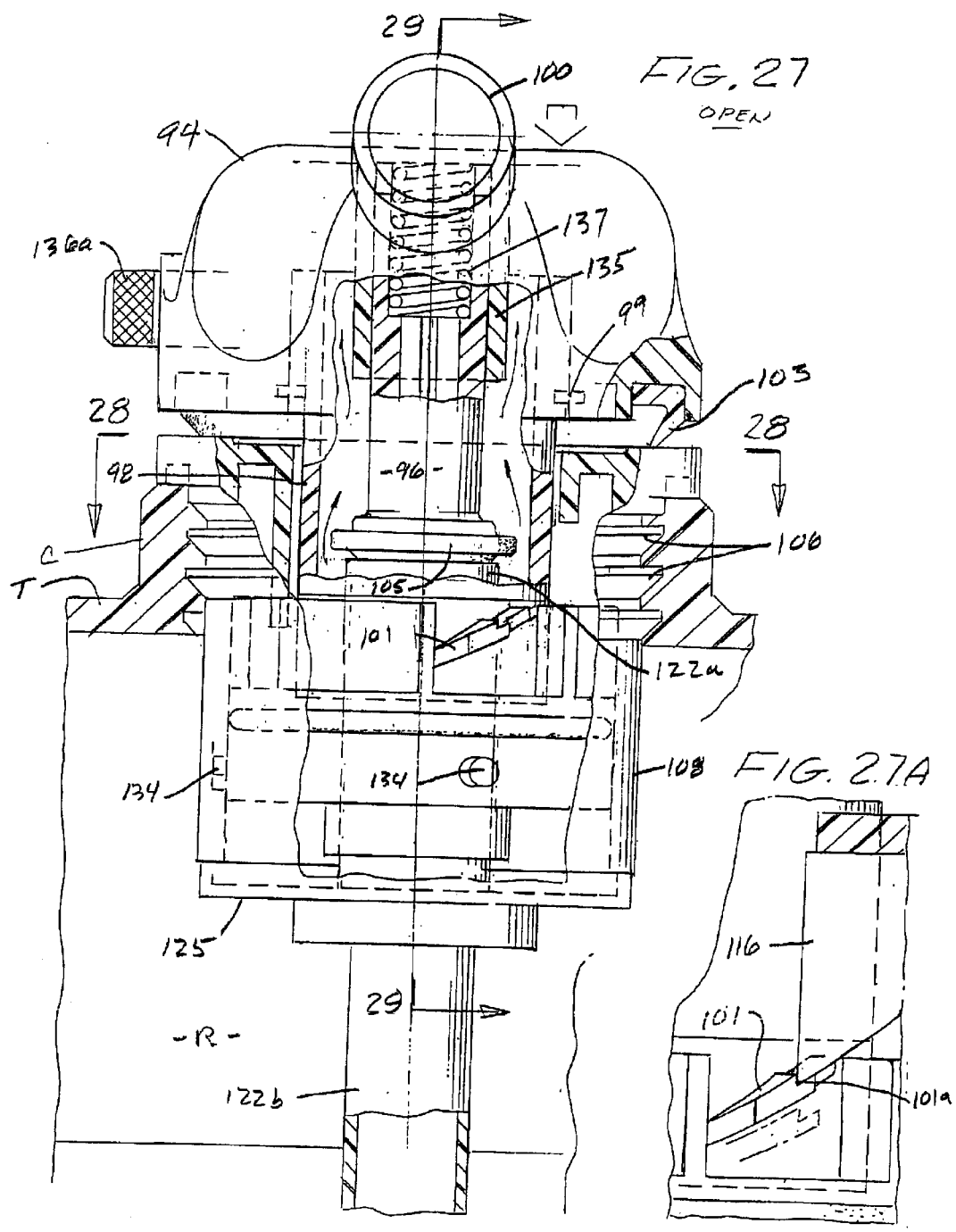

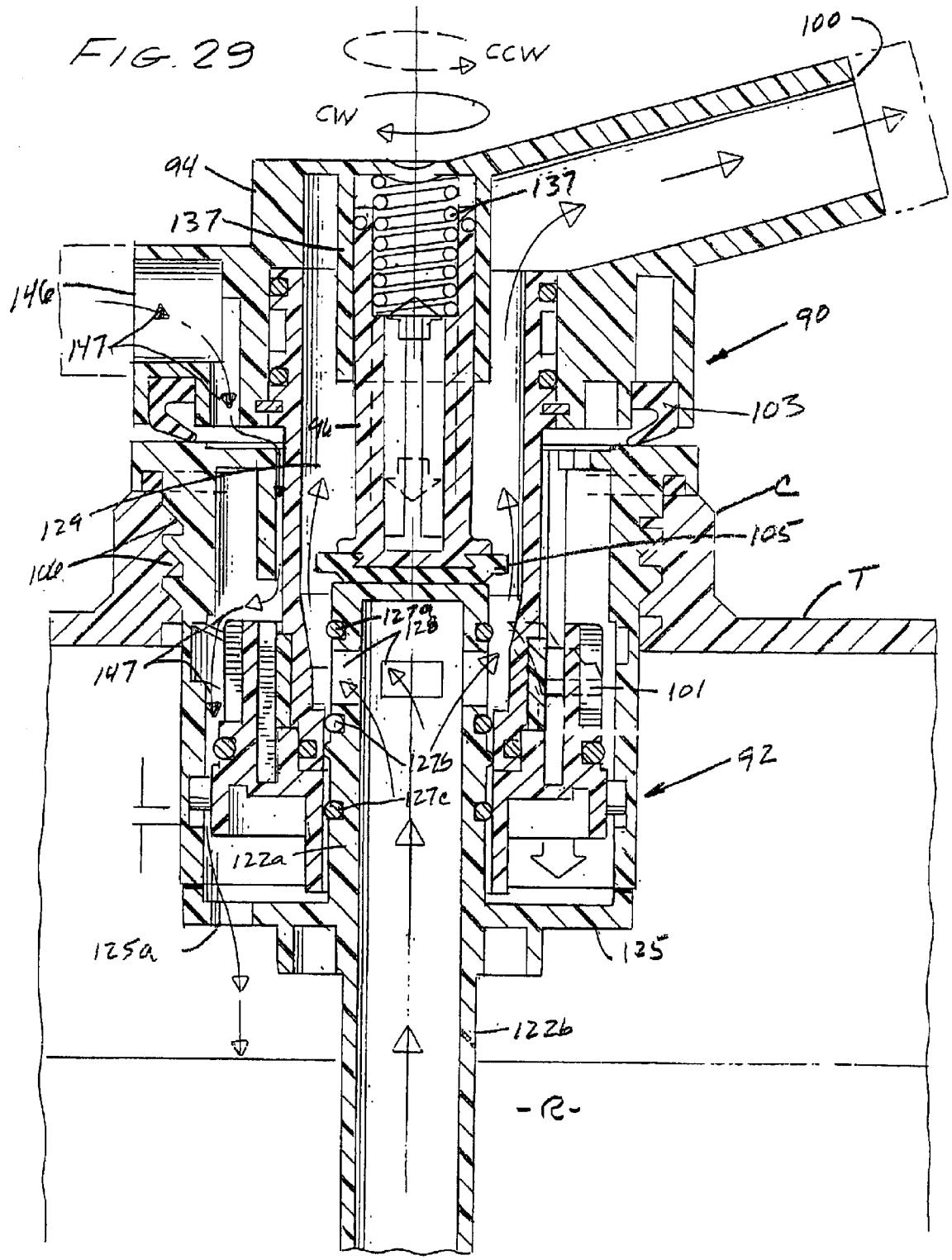

US 6,920,893 B2

CORROSIVE RESISTANT LIQUID EXTRACTION APPARATUS

This is a Continuation In part Application of U.S. application Ser. No. 09/827,070 filed Apr. 4, 2001 now U.S. Pat. No. 6,644,340.

BACKGROUND OF THE INVENTION

1. Field of the Invention

The present invention relates generally to systems for the filling, transport, and emptying of liquid containers More particularly, the invention concerns a novel, corrosion resistant liquid extraction apparatus that includes a novel plastic valve that can be removably connected to a liquid transport container. In turn, the valve can be interconnected with a specially configured, corrosion-resistant, plastic coupler that operates the valve in a manner to enable fluid to be extracted from the container.

2. Discussion of the Prior Art

The storage and transport of liquids and particularly the storage and transport of hazardous liquids have long presented substantial problems. For many years liquids were stored and transported in throwaway type metal and plastic containers. Typically, such containers were provided with a threaded liquid outlet port, which, after the container was filled, was closed, by some type of threaded cap. The use of these types of containers was costly, inefficient and often hazardous, particularly when the containers were used to store and transport potentially dangerous chemicals.

In recent years substantial efforts have been made to develop new systems to improve container and drum management capabilities, minimize user exposure to hazardous materials and address emerging governmental regulations. These efforts have resulted in the development of several different types of reusable systems for transferring liquid formulations from returnable closed drums and containers. As a general rule, these systems to a greater, or lesser extent, simplify drum emptying, minimize operator hazards, improve cleanliness and eliminate costly waste inherent in prior art disposable container systems. One of the most advanced of such improved systems was developed by and is presently commercially available from Micro Matic, Inc. of Northridge, Calif.

The Micro Matic system, which is described in U.S. Pat. No. 5,901,747 issued to the present inventor, basically comprises a two-part system that includes a coupler operated extractor valve which can be interconnected with a conventional drum via existing threaded connections and a cooperating coupler which connects to the extractor valve to allow drum emptying through the use of a remote pumping system. The extractor valve apparatus includes a valve body and a down tube connected to the valve body, which extends to the bottom of the drum to permit the complete transfer of liquid from the drum.

Another Micro Matic prior art liquid transfer system is described in U.S. Pat. No. 5,944,229 also issued to the present inventor. This invention concerns a novel, tamperproof, safety valve system that includes a tamper evident valve closure cap that must be broken before liquid can be removed from the container.

The Micro Matic systems, while representing the best of the current state of the art liquid transfer systems, have certain drawbacks which are sought to be overcome by the system of the present invention More particularly, the metal valve and coupler assemblies of the Micro Matic systems are of a relatively complex design making them somewhat difficult and costly fabricate. Further, in some respects these metal assemblies are not well suited for use with various types of hazardous and highly corrosive chemicals that are frequently stored and transported.

As will be better appreciated from the discussion that follows, unlike the prior art Micro Matic systems, the novel valve and coupler of the improved system of the present invention are of an elegantly simple design and are uniquely constructed from a corrosive resistant plastic that is substantially impervious to most corrosive liquids. Additionally, the improved system provides a customer unique, key type coupler-valve mating interface that precludes removal of the drum contents by unauthorized persons

SUMMARY OF THE INVENTION

It is an object of the present invention to provide a novel liquid transfer system that includes a valve and coupler assembly of unique design for use in extracting hazardous fluids from a transport container. More particularly, it is an object of the invention to provide a liquid transfer system of the aforementioned character that includes a novel valve and coupler assembly that is of a simple design and is uniquely constructed from a corrosive resistant plastic that is substantially impervious to most corrosive liquids.

Another object of the invention is to provide a system of the character described which improves container and drum management while at the same time significantly reducing the material and labor costs inherent in the fabrication of the prior art liquid transfer systems.

Another object of the invention is to provide a liquid transfer system, which includes a novel plastic valve mechanism, which can be readily removably connected to a container such as a metal or plastic drum, and a novel, plastic coupler mechanism that can be removably coupled with the plastic valve mechanism for operating the valve mechanism. An important aspect of the liquid transfer system resides in the fact that the valve mechanism is specially configured so that only a coupler of a special, mating configuration can be interconnected with the valve mechanism. In this way, couplers and valves can be custom designed for individual users and use of or tampering with containers belonging to the individual user by users of similar systems is positively prevented.

Another object of the invention is to provide a fluid transfer system of the aforementioned character, which is highly reliable in operation, has a long useful life and is easy to use with a minimum amount of instruction being required.

Another object of the invention is to provide a system of the character described in the preceding paragraphs, which is inexpensive to produce and requires minimum maintenance.

In summary, the novel liquid transfer system of the present invention includes a valve and coupler assembly of unique design and a remote pump means that can be connected to the coupler to extract hazardous fluids from a transport container. The plastic valve of the system comprises a valve body that is connected to the container, which includes a coupler receiving portion and a hollow skirt portion, the hollow skirt portion have a spiral guideway formed therein. An insert having a central bore is sealably received within the skirt portion for rotational movement by the coupler between a first valve closed position and a second valve open position. A down tube assembly is connected to the valve body and includes a stem portion that is sealably received within the central bore of the insert. The coupler of the liquid transfer system, which includes a fluid outlet passageway in communication with the fluid passageway of the down tube assembly, can be conveniently, removably connected to the valve body for imparting rotation to the insert. The plastic valve further includes a radially outwardly extending protuberance that is closely receivable within said spiral groove of the skirt portion of said valve body and the coupler receiving portion of the valve body is provided with circumferentially spaced openings which receive circumferentially spaced blades provided on the coupler. The insert of the plastic valve, in turn, includes upstanding fingers that are engagable by the spaced-apart blades when the coupler is connected to said valve body. In one form of the invention, the coupler also includes a downwardly extending first sleeve, an upwardly extending second sleeve telescopically received within the first sleeve and biasing means for yieldably resisting telescopic movement of the second sleeve into the first sleeve.

BRIEF DESCRIPTION OF THE DRAWINGS

FIG. 5 is a cross-sectional view taken along lines 5—5 of FIG. 4.

FIG. 6 is a cross-sectional view taken along lines 6—6 of FIG. 4.

FIG. 8 is a view similar to FIG. 3 but showing the coupler moved into a valve open position.

FIG. 9 is a cross-sectional view similar to FIG. 4, but showing the valve assembly in a valve open configuration.

FIG. 10 is a cross-sectional view taken along lines 10—10 of FIG. 9.

FIG. 11 is a cross-sectional view taken along lines 11—11 of FIG. 9.

FIG. 13 is a generally perspective, exploded view of an alternate form of the valve and coupler assembly of the invention.

FIG. 14 is a top plan view of the assembly shown in FIG. 13, partly broken away to show internal construction.

FIG. 15 is a generally perspective, exploded view of yet another embodiment of the invention.

FIG. 16 is a top plan view of the embodiment shown in FIG. 15 partly broken away to show internal construction.

FIG. 17 is a generally perspective view of still another form of the coupler and valve assembly of the invention.

FIG. 18 is a top plan view of the assemblage shown in FIG. 17 partly broken away to shown internal construction.

FIG. 19A is a generally perspective, exploded view of an alternate form of the coupler assembly of the liquid transfer system of the invention.

FIG. 19B is a generally perspective, exploded view of an alternate form of the valve assembly of the liquid transfer system of the invention.

FIG. 19C is a generally perspective, fragmentary exploded view of a locking assembly that comprises a part of the coupler assembly of this latest form of the invention that locks the cap assembly of the coupler assembly against rotation relative to the body portion of the coupler assembly.

FIG. 20 is a top plan view of the coupler assembly.

FIG. 22 is a view taken along lines 22—22 of FIG. 21.

FIG. 23 is a cross-sectional view taken along lines 23—23 of FIG. 21.

FIG. 24 is a cross-sectional view taken along lines 24—24 of FIG. 21.

FIG. 25 is a planar projection of the upper portion of the valve assembly of this latest form of the invention and the lower portion of the coupler assembly showing the manner in which the coupler blades interact with the valve assembly.

FIG. 26 is a top plan view of the coupler assembly similar to FIG. 20, but showing the cap portion of the coupler assembly rotated to a second position.

FIG. 27 is a view partly in cross section taken along lines 27—27 of FIG. 26.

FIG. 27A is an enlarged fragmentary view showing the manner of locking the blade-like components of the valve assembly against rotation when the valve is in the open position.

FIG. 28 is a cross-sectional view taken along lines 28—28 of FIG. 27.

FIG. 29 is a cross-sectional view taken along lines 29—29 of FIG. 27.

FIG. 30 is a planar projection of the upper portion of the valve assembly of the invention and the lower portion of the coupler assembly similar to FIG. 25 but showing the portion of the components as they appear in a valve-open configuration.

FIG. 31 is a cross-sectional view similar to FIG. 24, but showing the locking means moved into a locking position to enable rotation of the insert assembly toward a valve open position.

DESCRIPTION OF THE INVENTION

Figure 1:
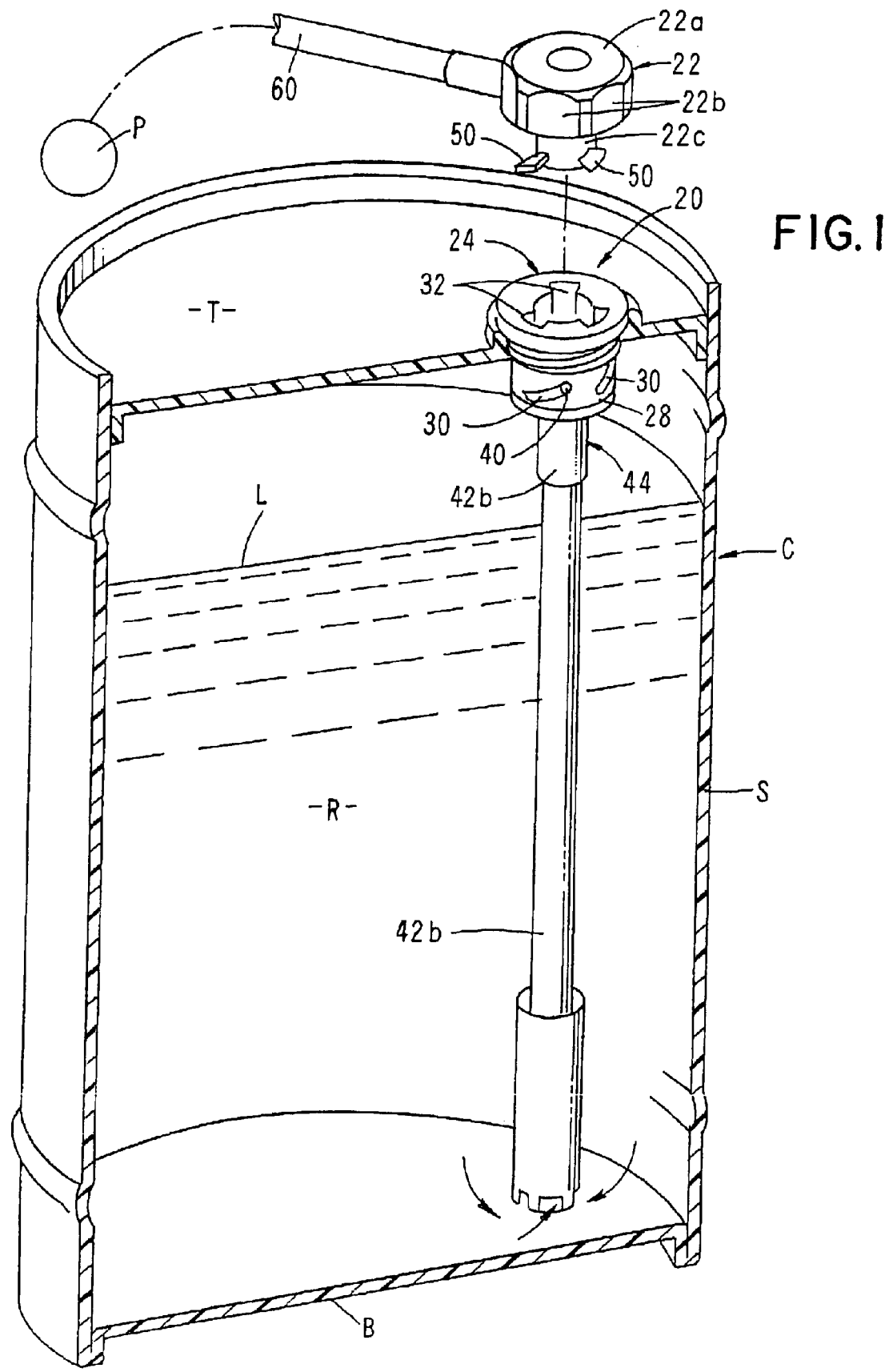
FIG. 1 is a generally perspective, exploded view of one form of the liquid transfer system of the invention showing the fluid container broker away to reveal internal construction.
Figure 2:
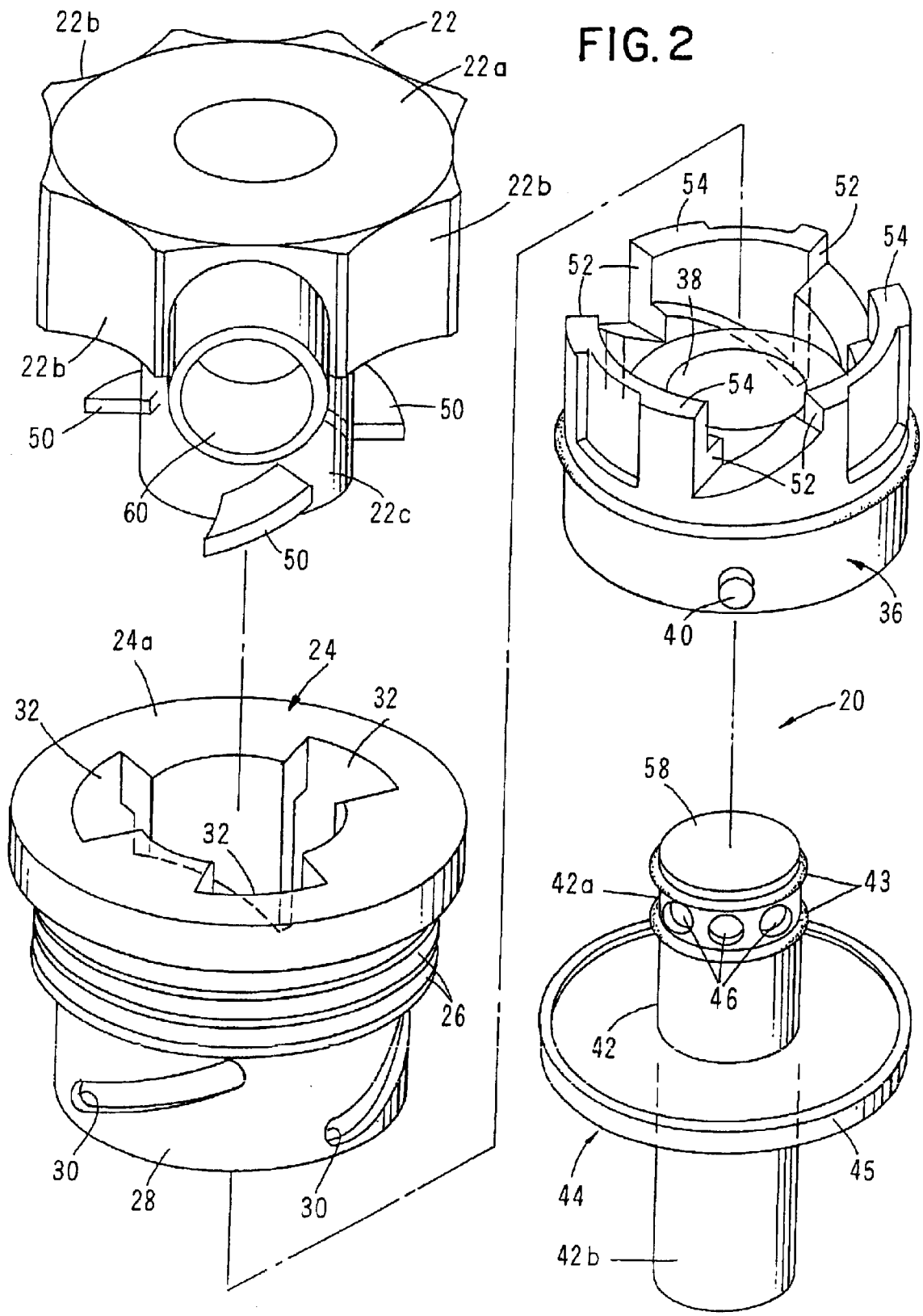
FIG. 2 is a generally perspective exploded view of one form of the coupler assembly and valve assembly of the invention.

Referring to the drawings and particularly to FIG. 1, one form of the apparatus is there shown interconnected with a conventional liquid transport container "C". Container "C" includes interconnected top, bottom and side walls "T", "B", and "S" respectively that define a liquid reservoir "R". The apparatus of the invention here comprises a valve assembly 20 that is threadably connected with top wall "T" of the container, a coupler assembly 22 that can be removably interconnected with valve assembly 20 and a remotely located pumping means "P" for pumping the liquid "L" from the transport container. As best seen in FIG. 2, valve assembly 20 comprises a valve body 24 that is threadably connected to top wall "T" of container "C" by conventional threads 26 formed on the valve body. Valve body 24 includes a tubular shaped skirt portion 28 that is provided with a plurality of circumferentially spaced, curved grooves 30, the purpose of which will presently be described. The top wall 24a of valve body 24 is provided with a plurality of circumferentially spaced irregularly shaped openings 32 which here are generally fan shaped.

Valve assembly 20 further includes a generally cylindrically shaped insert 36 that is rotatably received within skirt portion 28 of valve body 24. In a manner presently to be described, insert 36 can be moved by the coupler assembly 22 from a first valve closed position to a second valve open position. As best seen in FIG. 6, insert 36 is provided with a central, generally cylindrically shaped bore 38 that telescopically receives upper portion 42a of stem 42 which forms a part of a down tube assembly generally designated by the numeral 44 (FIG. 2). Down tube assembly 44 also includes a flange portion 45 that is interconnected with skirt 28 of valve body 24 in the manner shown in FIG. 6. As indicated in FIG. 6, stem 42 is connected to and extends both upwardly and downwardly from flange 46. The upper portion 42a of the stem, which carries an elastomeric O-ring 43, is sealably received within central bore 38 of insert assembly 36, while the lower portion 42b extends downwardly within reservoir "R". As indicated in FIG. 2, the upper portion 42a of stem 42 is provided with a plurality of circumferentially spaced fluid passageways 46. As will presently be described, when the coupler assembly 22 is interconnected with the valve assembly and is rotated into the valve-open position, fluid passageways 46 will move into communication with an outlet passageway formed in coupler assembly 22, which, in turn, communicates with the pumping means "P" (FIG. 1).

Turning particularly to FIGS. 2 and 6, the novel coupler assembly of the present invention can be seen to comprise an upper gripping portion 22a having finger gripping segments 22b and a lower, downwardly extending, generally tubular portion 22b. Affixed to portion 22b of the coupler assembly are circumferentially spaced blade-like members 50 which engage circumferentially spaced surfaces 52 formed on a plurality of upstanding, finger-like portions 54 that comprise a part of insert 36.

Figure 4:
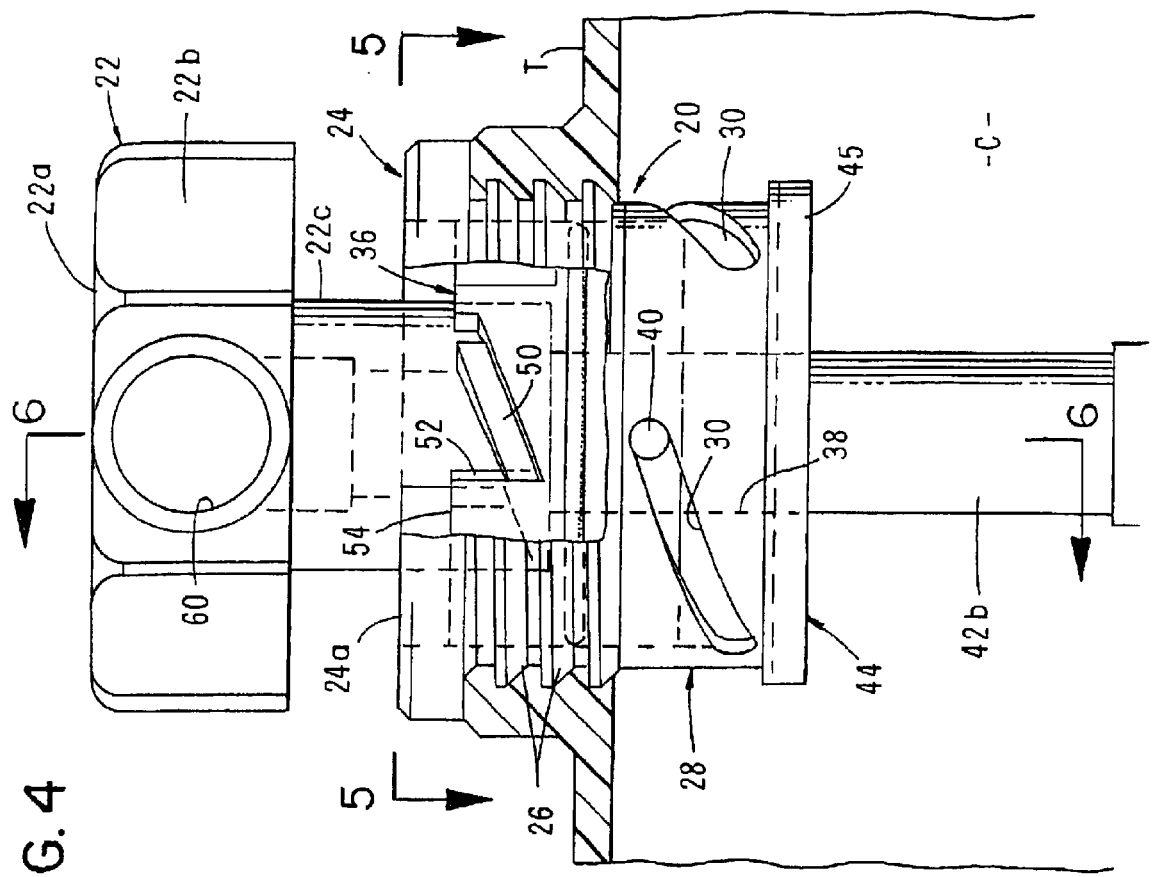
FIG. 4 is a view taken along lines 4—4 of FIG. 3, partly broken away to show internal construction.
Figure 7:
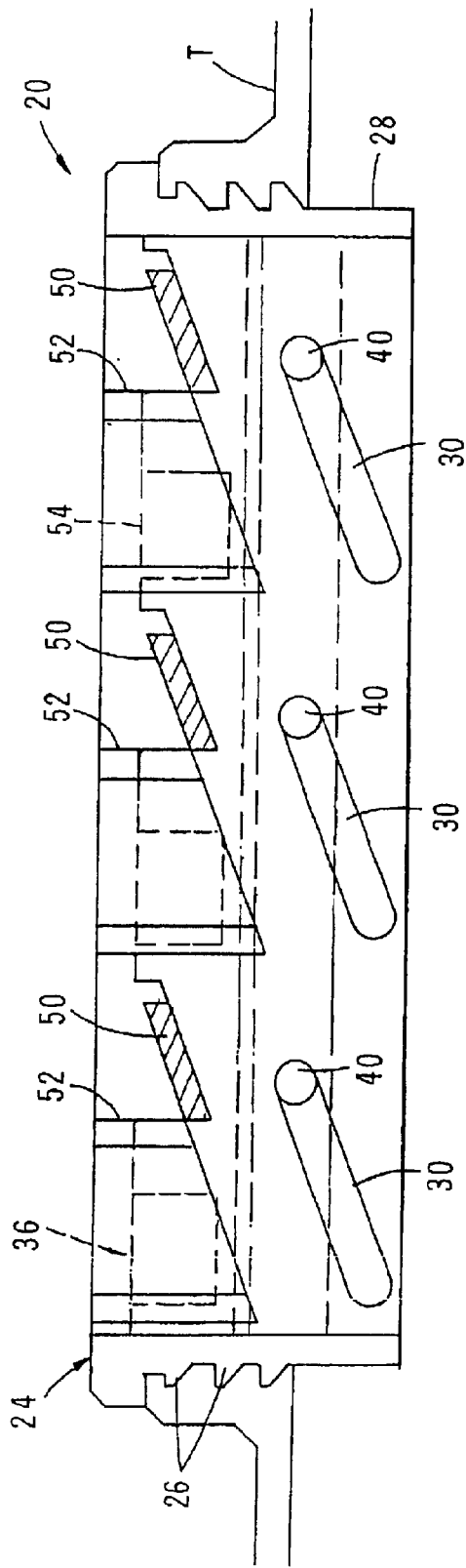
FIG. 7 is a planer projection of the upper portion of the valve assembly of the invention and the lower portion of the coupler assembly showing the manner in which the coupler blades interact with the valve assembly.
Figure 12:
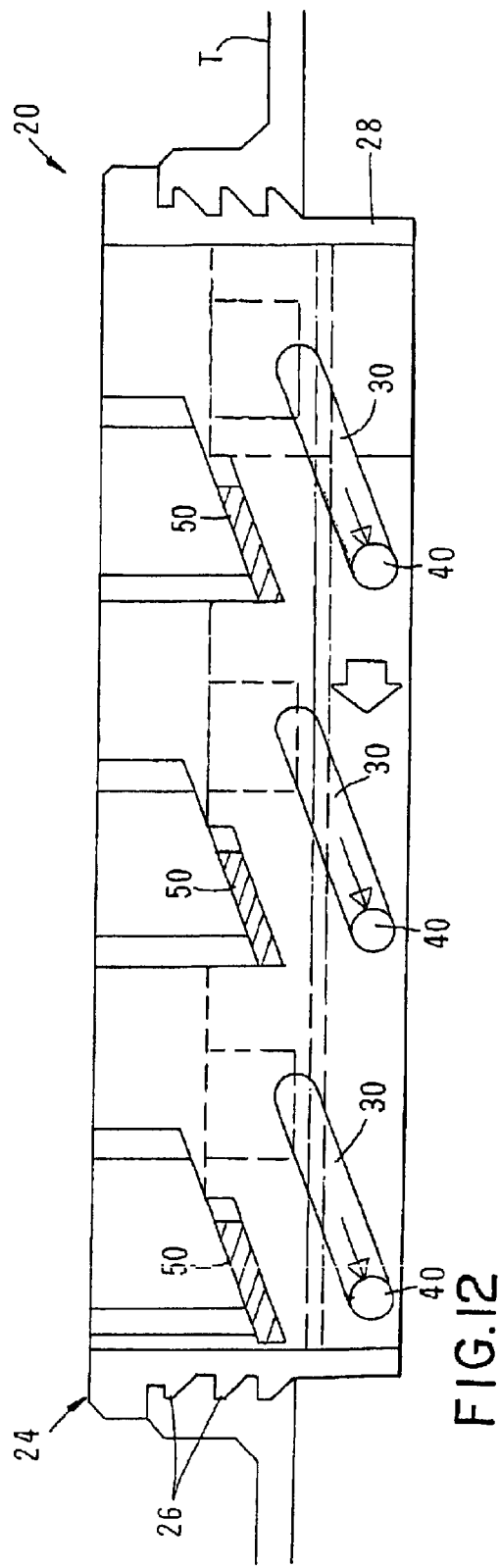
FIG. 12 is a planer projection similar to FIG. 7, but showing the valve assembly having been moved into a valve open configuration.
Figure 21:
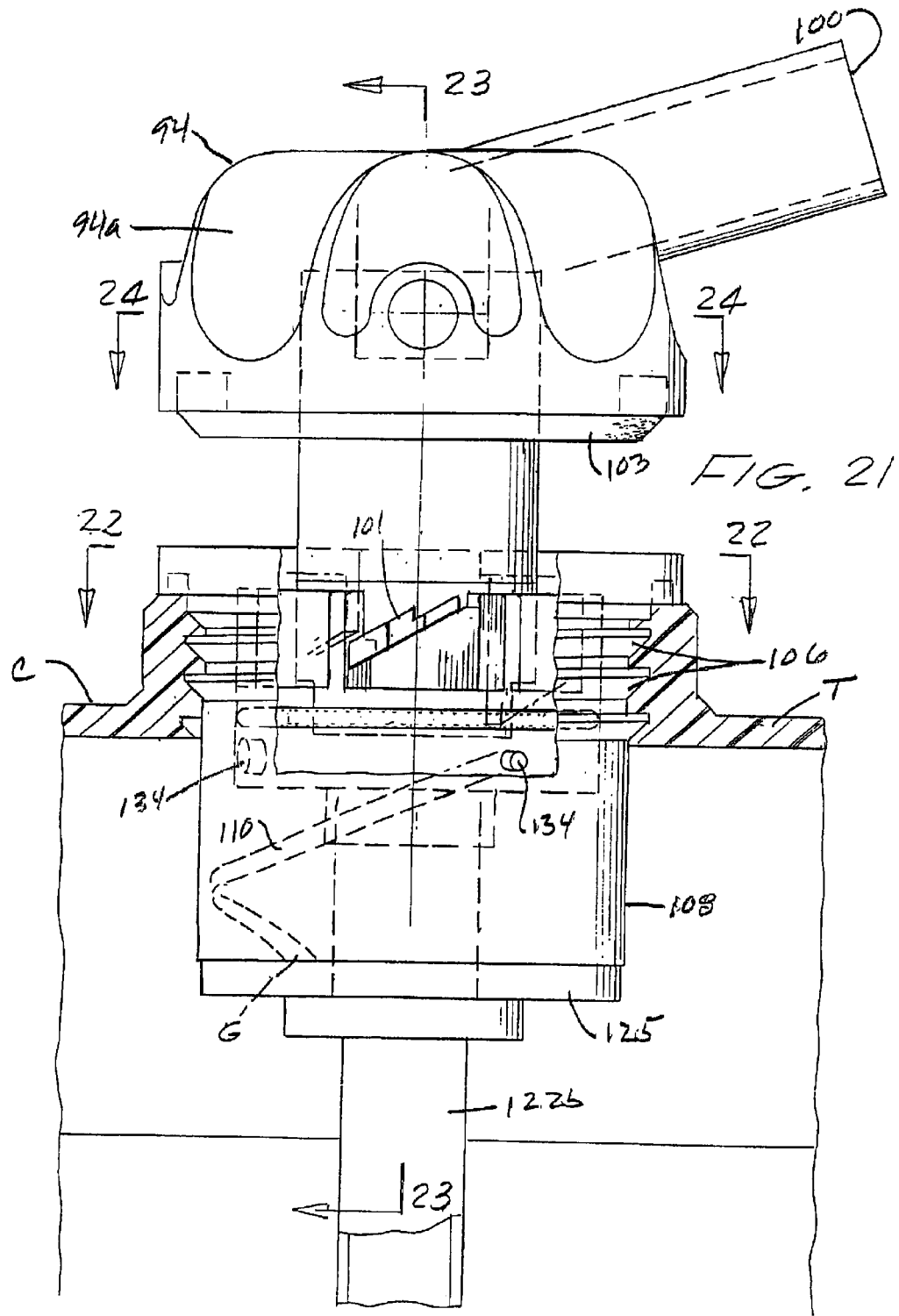
FIG. 21 is a view partly in cross section taken along lines 21—21 of FIG. 20.

As indicated in FIG. 4, when the coupler assembly 22 is mated with the valve assembly, the generally fan shaped blades 50 will be received within the fan shaped openings 32 and the edges thereof will engage walls 52 of fingers 54 upon rotation of the coupler. With this construction, rotation of coupler assembly 22 relative to valve assembly 24 will cause blades 50 to impart rotation to insert 24 between the first valve closed position shown in FIG. 6 and the second valve open position shown in FIG. 11. In this regard, it is to be noted that protuberances 40 of insert 36 are received within curved grooves or slots 30 so that, upon rotation of insert 36 by the coupler assembly 22, protuberances 40 will move along grooves 30 urging downward movement of insert 36 from the valve closed position shown in FIG. 6 to the valve open position shown in FIG. 11 (see also FIGS. 7 and 12).

As indicated in FIG. 6, when the valve is in the closed position, a valve seat-engaging sleeve 56 formed on coupler assembly 22 will sealably engage a valve seat 58 formed on upper stem portion 42a. When the valve is in the valve open position illustrated in FIG. 11, it is to be noted that outlet passageways 46 provided in stem portion 42a can freely communicate with outlet passageway 60 formed in coupler assembly 22 and with the pumping means (FIG. 1). Accordingly, when the valve is in the valve open position shown in FIG. 11, upon urging of the pumping means, the liquid "L" can be drawn from the container "C" upwardly through the down tube assembly in the direction of the arrow 61 in FIG. 11, through outlet passageways 46, into passageway 60 and then outwardly of the apparatus in a direction toward the pump means "P". Pump means "P" can comprise any suitable commercially available pump of a character well understood by those skilled in the art.

As illustrated in FIGS. 6 and 11, coupler assembly 22 includes a downwardly extending sleeve 64 which telescopically receives an upwardly extending sleeve 66. Sleeve 66 terminates in an end wall 66a that engages the top of valve seat 58. Disposed within sleeves 64 and 66 is biasing means for yieldably resisting telescopic movement of second sleeve 66 into first sleeve 64. This biasing means is here provided in the form of a conventional coil spring 68. As indicated in FIG. 11, as the coupler assembly is rotated into the valve open position there shown, spring 68 will be compressed in a manner that will urge coupler 22 to return to its upward, valve closed position as shown in FIG. 6.

Figure 3:
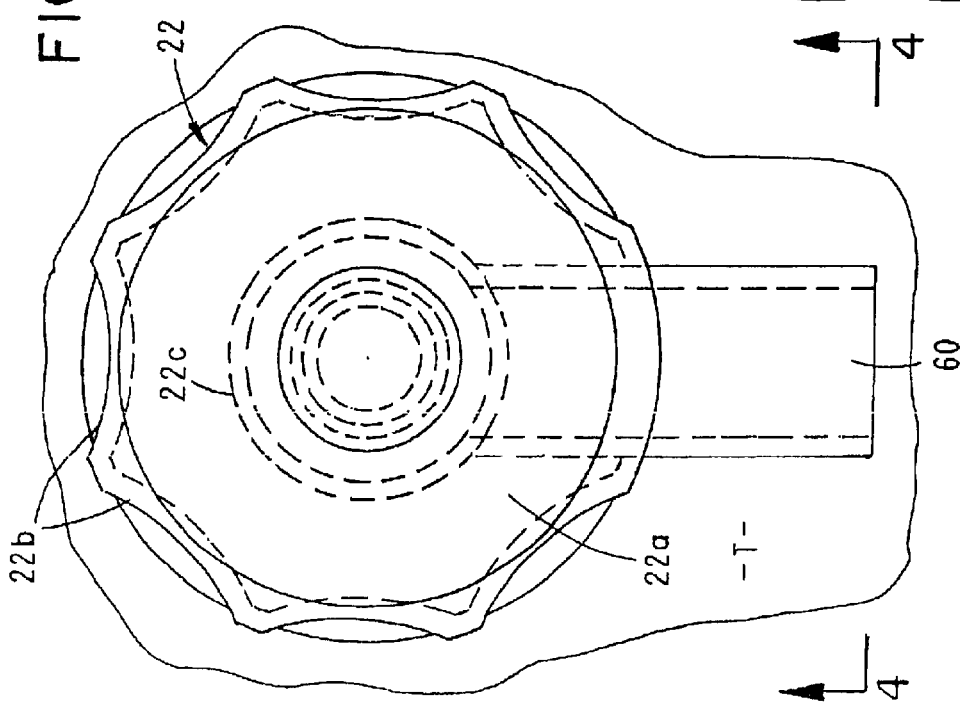
FIG. 3 is a greatly enlarged fragmentary top plan view of a portion of the system shown in FIG. 1.

With the construction described in the preceding paragraphs, as the coupler assembly is rotated relative to the valve assembly, from the position shown in FIGS. 3 and 4 to the position shown in FIGS. 8 and 9, valve seat engaging sleeve 56 will move telescopically downwardly over the upper portion 42a of stem 42 against the urging of the biasing means or spring 68. When the coupler assembly reaches the position shown in FIG. 11, valve seat engaging sleeve 56 will have moved telescopically downwardly relative to stem portion 42a to a position where outlet passageways 46 are in fluid communication with passageway 60 formed in coupler assembly 22. With the apparatus in the valve-open position, energization of pump "P" will, of course, cause fluid to be drawn from the container "C" outwardly of the apparatus in the direction toward pump "P". Rotation of coupler assembly 22 in the opposite direction will, of course, cause the apparatus to return to the valve closed position shown in FIG. 6 where sleeve 56 will sealably engage valve seat 58.

Turning to FIGS. 13 and 14, an alternate form of the apparatus of the invention is there shown. This form of the invention is similar in most respects to that shown in FIGS. 1 through 12 and like numerals are used to identify like components. However, in the embodiment of the invention shown in FIGS. 13 and 14, the circumferentially spaced openings 71 formed in the valve body are of a slightly different configuration as are the blades 73 of the coupler assembly. More particularly, as indicated in FIG. 13, blades 73 are provided with a plurality of key-like shoulders 73a that are closely received within the keyhole-like openings 71 provided in the valve assembly. It is apparent that, unless the coupler is provided with the correctly configured blades, the coupler cannot be used in conjunction with the valve body 24 of the character shown in FIG. 13.

Turning to FIGS. 15 and 16, still another form of the apparatus of the invention is there shown. Once again, this apparatus is similar to that previously described and like numerals are used to identify like components. In the embodiment of the invention shown in FIGS. 15 and 16, the circumferentially spaced openings 75 formed in the valve assembly are of a different configuration from that shown in FIGS. 1 through 12, but are similar to those shown in FIGS. 13 and 14. Similarly, the blades 77 formed on the coupler assembly are of a different configuration from those shown in FIGS. 1 through 12. However, the blades in the apparatus shown in FIGS. 15 and 16 are of similar configuration to those shown in FIGS. 13 and 14. Although this is the case, as indicated by the arrow 79 in FIG. 15, in this latest embodiment of the invention, the coupler is rotated in a counterclockwise direction rather than a clockwise direction to move valve assembly from a valve closed position to a valve open position. Once again, with this important distinction, unless the coupler is provided with properly configured blades 77, the coupler cannot be used with the valve assembly having the configuration shown in FIG. 15.

Referring next to FIGS. 17 and 18, yet another form of the apparatus of the invention is there shown. Again, this form of the apparatus is similar in most respects to the apparatus previously described and like numerals are used in FIGS. 17 and 18 to identify like components. In this latest embodiment of the invention, it is to be noted that the operating blades 81 of the coupler assembly and the openings 83 provided in the valve assembly are once again of a different configuration. More particularly, as best seen in FIG. 17, blades 81 include a central radially outwardly extending protuberance 81a that is received within a notch-like opening 83a that forms a part of each of the blade receiving openings of the valve assembly.

It is clear from a study of FIGS. 13 through 18 that the coupler assemblies as well as the valve assemblies can be specially configured for particular customer so that only couplers belonging to that customer can be used to operate valves belonging to the customer.

It is to be understood that the configuration of the blades and openings of the apparatus shown in the drawings is only exemplary, and that any number of mating configurations of blades and openings can be provided to the customer.

Turning to FIGS. 19A, 19B, 19C, and 20 through 31, still another form of the apparatus of the invention is there shown. This form of the invention is similar in many respects to that shown in FIGS. 1 through 12 and like numerals are used to identify like components. However, in this latest embodiment of the invention the coupler assembly 90 is of a slightly different construction and mates with a valve assembly 92 (FIG. 19B) that is also of a slightly different construction. More particularly, as indicated in FIG. 19A, the novel coupler assembly of the present invention can be seen to comprise an upper, cap assembly 94 having finger gripping segments 94a, a seal tube 96 having a central bore 97 and a body portion 98. Cap assembly 94 is rotatably interconnected with body portion 98 by a split ring 99 (FIG. 23). With the construction shown in the drawings, when the coupler assembly is in normal configuration, the cap can be rotated relative to body portion 98 so that an angularly upwardly extending tubular outlet port 100 provided on the cap can be optimally positioned to permit the easy and convenient interconnection of the outlet port with a pumping unit "P" (FIG. 26). Locking means, the character of which will presently be discussed, are provided to enable the cap assembly 94 to be interlocked with body portion 98 to enable rotation of the valve insert component of the valve assembly, the nature of which will presently be described.

Affixed to body portion 98 of the coupler assembly are circumferentially spaced blade-like members 101 the purpose of which will presently be described. Also comprising a part of the coupler assembly is sealing means, shown here as a sealing ring 103 for sealably interconnecting the coupler assembly with the valve assembly.

As best seen in FIGS. 19B and 23, valve assembly 92 comprises a valve body 104 that is threadably connected to top wall "T" of container "C" (see FIG. 23) by conventional threads 106 formed on the valve body. As illustrated in FIG. 19B, valve body 104 includes a tubular shaped skirt portion 108 that is provided with a generally spiral shaped guideway 110, the purpose of which will presently be described. As before, the top wall 104a of valve body 104 is provided with a plurality of circumferentially spaced irregularly shaped openings 112 which here are generally fan shaped in configuration.

Valve assembly 92 further includes a generally cylindrically shaped insert component 116 that is rotatably received within skirt portion 108 of valve body 104. In a manner presently to be described, insert 116 can be moved by the coupler assembly 90 from a first, valve closed position shown in FIGS. 21 and 23 to a second, valve open position shown in FIGS. 27 and 29. Insert 116 is provided with a central, generally cylindrically shaped bore 118 that telescopically receives the upper portion 122a of a stem 122 which forms a part of a down tube assembly. This down tube assembly is similar in construction and operation to the down tube assembly shown in FIG. 2 and there generally designated by the numeral 44. As in the earlier described embodiments, the down tube assembly also includes a circular flange portion 125 that is provided with a vent opening 125a. Flange portion 125 is sealably interconnected with skirt 108 of valve body 104 in the manner shown in FIG. 23. As indicated in FIGS. 19B and 23, stem 122 is connected to and extends both upwardly and downwardly from flange portion 125. The upper portion 122a of the stem, which carries three elastomeric O-rings 127a, 127b and 127c, is sealably received within central bore 118 of insert assembly 116, while the lower portion 122b extends downwardly within reservoir "R". As indicated in FIG. 19B, the upper portion 122a of stem 122 is provided with a plurality of circumferentially spaced fluid passageways 128. As will presently be described, when the coupler assembly 90 is interconnected with the valve assembly 92 and is rotated into the valve-open position shown in FIG. 29, fluid passageways 128 will move into communication with an outlet passageway 129 formed in coupler assembly 90, which, in turn, communicates with the pumping means, such as the pumping means "P" of FIG. 26.

As indicated in FIGS. 22, 27 and 28 when the coupler assembly 90 is mated with the valve assembly 92, the generally fan shaped blades 101 that are provided on body portion 98 will be received within the fan shaped openings 112 formed in valve body 104 to enable their engagement with circumferentially spaced surfaces 130 formed on a plurality of upstanding, finger-like portions 132 that comprise a part of insert 116 (FIG. 19B). At the same time, the tube sealing means provided on seal tube 96 will move into sealing engagement with the top wall 122c of down tube 122. This sealing means is here provided in the form of an elastomeric seal member 105 (FIGS. 19A and 23).

With the construction described in the preceding paragraph, rotation of coupler assembly 90 relative to valve assembly 92 will cause blades 101 to impart rotation to insert 116 between the first valve closed position shown in FIG. 23 and the second valve open position shown in FIG. 29. In this regard, it is to be noted that protuberances 134 formed on insert 116 are received within spiral guideway 110 so that, upon rotation of insert 116 by the coupler assembly 94, protuberances 134 will move along guideway 110 urging a downward movement of insert 116 from the valve closed position shown in FIG. 23 to the valve open position shown in FIG. 29 (see also FIGS. 25 and 30).

As illustrated in FIGS. 19A and 23, cap assembly 94 includes a downwardly extending sleeve 135, which telescopically receives seal tube 96. Disposed within seal tube 96 and sleeve 135 is biasing means for yieldably resisting telescopic movement of seal tube into sleeve. This biasing means is here provided in the form of a conventional coil spring 137. As indicated in FIG. 29, as when coupler assembly is rotated into the valve open position there shown, spring 137 will be compressed in a manner that will urge the coupler assembly to return to its upward, valve closed position as shown in FIG. 23. However as will be described in the paragraphs that follow, blades 101 are configured to include a step 101a having a shoulder 101b (FIG. 25) that will engage an edge 116a formed on insert 116 so as to prevent the counter-rotation of the coupler assembly into a valve closed position until a downward force is exerted on cap 94 (see FIGS. 19B, 25 and 30).

The earlier described locking means, which here comprises a finger engaging assembly 136 having a knurled knob 136a and an outwardly extending locking stem 138 (FIG. 19C) enables the user to interlock cap 94 with valve body 98 so that rotation of the cap will impart rotation to the valve body 98. As shown in FIG. 19C, the knurled knob 136a includes a plurality of slots 136b that receive a locking pin 139 carried by the cap assembly when the finger engaging assembly is in position within a bore 94b formed in cap 94. A coil spring 141 surrounds stem 138 and functions to continuously urge the finger engaging assembly outwardly into the position shown in FIG. 24 where the extremity 138a of stem 138 is spaced apart from body portion 98 of the coupler assembly. As illustrated in FIG. 31, an inward force exerted on the finger engaging assembly in the direction of the arrow, will cause the extremity of the stem to enter into a selected one of a plurality of circumferentially spaced slots 98a formed in body 98. With the locking stem 138 of the locking means in the position shown in FIG. 31, rotation of the cap will impart rotation to body portion 98 of the valve. Conversely, with the locking stem in the position shown in FIG. 24, the cap can be freely rotated relative to body portion 98 to a position where the pump "P" can be most conveniently interconnected with tubular outlet port 100.

In using the apparatus of the invention with the apparatus in the valve closed position shown in FIG. 23, the operator first depresses the finger engaging assembly 136 in the manner shown in FIG. 31 to operably interconnect cap assembly 94 with coupler body 98. This done, rotation of the cap assembly 94 will cause rotation of body portion 98, which in turn will cause the valve to move from the valve closed position shown in FIG. 23 to the valve open position shown in FIG. 29. As the coupler assembly is rotated relative to the valve assembly, seal tube 96 will be moved upwardly against the urging of coil spring 137 into the position shown in FIG. 29. When the coupler assembly reaches the position shown in FIG. 29, outlet passageways 128 are in fluid communication with passageway 129 formed in coupler assembly 90. With the apparatus in the valve-open position, and with the finger engaging assembly 136 in its normal retracted position, cap assembly 94 can be freely rotated to position outlet port 100 at a desired location to enable expedicious interconnection of the port with the pump "P".

Before energizing the pump "P" gas is introduced into an inlet port 146 formed in the cap assembly (FIG. 29). This priming gas will flow in the direction of the arrows 147 of FIG. 29, through the cap or assembly, through the valve assembly and into the reservoir "R" of the container "C" to impart a pressure on the liquid contained therein. Following this priming step, energization of pump "P" will cause fluid to be drawn from the container "C" outwardly of the apparatus in a direction toward pump "P".

Referring particularly to FIGS. 25, 27, 27A and 30, with the cap assembly coupled with the body portion 96 by the previously described locking means, rotation of the cap assembly will cause the protuberances 34 to travel within the spiral groove 110 from the starting position depicted in FIG. 25 into the position depicted in FIG. 30. This, of course, moves insert 116 downwardly into the valve open position shown in FIG. 29. As previously described, when insert 116 reaches the position shown in FIGS. 27, 27A and 30, the blades 101 that are carried by coupler body 98 will engage the edges 116a of the insert and will be held in this locking position by the urging of compressed spring 137. With the blades in this locking position, counter-rotation of the cap assembly is blocked. However, a downward force exerted on the cap assembly against the urging of the spring 137 will enable the steps 101b to clear edges 116a so as to permit counter-rotation of the cap assembly and the return of the apparatus to the starting valve closed position shown in FIG. 23.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following documents.

I claim:

1. An apparatus for extracting liquids from a container comprising:
   (a) a valve assembly connected to the container comprising:
      (i) a valve body having a coupler receiving portion and a skirt portion, said skirt portion having a curved guideway formed therein;
      (ii) an insert sealably received within said skirt portion for rotation with respect thereto between a first valve closed position and a second valve open position, said insert having a central bore;
      (iii) a down tube assembly connected to said valve body, said down tube assembly including a stem portion sealably received within said central bore of said insert said stem portion having a fluid passageway;
   (b) a coupler assembly connected to said valve body for imparting rotation to said insert, said coupler assembly comprising a body portion having a central bore; a seal tube telescopically received within said central bore and a cap assembly rotatably connected to said body portion, said coupler assembly having a fluid outlet passageway in communication with said fluid passageway of said down tube assembly; and
   (c) pump means connected to said coupler for drawing liquid through said fluid outlet passageway.

2. The apparatus as defined in claim 1 in which said insert further includes a radially outwardly extending protuberance receivable within said curved guideway of said skirt portion of said valve body.

3. The apparatus as defined in claim 1 in which said coupler receiving portion of said valve body is provided with circumferentially spaced openings and in which said coupler assembly includes circumferentially spaced blades receivable within said circumferentially spaced openings.

4. The apparatus as defined in claim 1 in which said coupler assembly further comprises biasing means carried within said body portion for yieldably resisting telescopic movement of said seal tube within said central bore of said body portion.

5. The apparatus as defined in claim 1 in which said coupler assembly further includes sealing means for sealably interconnecting said coupler assembly with said valve assembly.

6. The apparatus as defined in claim 1 in which said coupler assembly further includes locking means for locking said cap assembly against rotation relative to said body portion.

7. The apparatus as defined in claim 1 in which said seal tube includes tube sealing means for sealably interconnecting said seal tube with said down tube assembly.

8. The apparatus as defined in claim 1 in which said down tube assembly comprises a tubular portion and a flange portion connected to said tubular portion, said flange portion having a vent opening.

9. The apparatus as defined in claim 1 in which said coupler assembly includes a gas inlet and in which said valve assembly includes a gas passageway in communication with said gas inlet and in communication with said container for pressurizing the container.

10. An apparatus for extracting liquids from a container comprising:
 (a) a valve assembly connected to the container comprising:
  (i) a valve body having a coupler receiving portion having a plurality of circumferentially spaced openings and a skirt portion, said skirt portion having a curved guideway formed therein;
  (ii) an insert sealably received within said skirt portion for rotation with respect thereto between a first valve closed position and a second valve open position, said insert having a central bore and a plurality of outwardly extending protuberances receivable within said curved guideway;
  (iii) a down tube assembly connected to said valve body, said down tube assembly including a stem portion sealably received within said central bore of said insert said stem portion having a fluid passageway;
 (b) a coupler assembly connected to said valve body for imparting rotation to said insert, said coupler assembly comprising a body portion having a central bore and a plurality of circumferentially spaced blades receivable within said circumferentially spaced openings in said coupler receiving portion of said valve body; a seal tube telescopically received within said central bore and a cap assembly rotatably connected to said body portion, said coupler assembly having a fluid outlet passageway in communication with said fluid passageway of said down tube assembly; and
 (c) pump means connected to said coupler for drawing liquid through said fluid outlet passageway.

11. The apparatus as defined in claim 10 in which said coupler assembly further comprises biasing means disposed within said cap assembly for yieldably resisting telescopic movement of said seal tube within said central bore of said body portion.

12. The apparatus as defined in claim 10 in which said coupler assembly further includes sealing means for sealably interconnecting said coupler assembly with said valve assembly.

13. The apparatus as defined in claim 10 in which said coupler assembly further includes locking means for locking said cap assembly against rotation relative to said body portion.

14. The apparatus as defined in claim 10 in which said seal tube includes tube sealing means for sealably interconnecting said seal tube with said down tube assembly.

15. The apparatus as defined in claim 10 in which said down tube assembly comprises a tubular portion and a flange portion connected to said tubular portion, said flange portion having a vent opening.

16. The apparatus as defined in claim 10 in which said coupler assembly includes a gas inlet and in which said valve assembly includes a gas passageway in communication with said gas inlet and in communication with said container for pressurizing the container.

17. An apparatus for extracting liquids from a container comprising:
 (a) a valve assembly connected to the container comprising:
  (i) a valve body having a coupler receiving portion having a plurality of circumferentially spaced openings and a skirt portion, said skirt portion having a curved guideway formed therein;
  (ii) an insert sealably received within said skirt portion for rotation with respect thereto between a first valve closed position and a second valve open position, said insert having a central bore and a plurality of outwardly extending protuberances receivable within said curved guideway;
  (iii) a down tube assembly connected to said valve body, said down tube assembly including a stem portion sealably received within said central bore of said insert said stem portion having a fluid passageway;
 (b) a coupler assembly connected to said valve body for imparting rotation to said insert, said coupler assembly having a fluid outlet passageway in communication with said down tube assembly and comprising:
  (i) a body portion having a central bore and a plurality of circumferentially spaced blades receivable within said circumferentially spaced openings in said coupler receiving portion of said valve body;
  (ii) a seal tube telescopically received within said central bore; and
  (iii) a cap assembly rotatably connected to said body portion;
  (iv) sealing means for sealably interconnecting said cap assembly with said valve assembly; and
  (v) biasing means disposed within said cap assembly for yieldably resisting telescopic movement of said seal tube within said central bore of said body portion; and
 (c) pump means connected to said coupler for drawing liquid through said fluid outlet passageway.

18. The apparatus as defined in claim 17 in which said coupler assembly further includes locking means for locking said cap assembly against rotation relative to said body portion.

19. The apparatus as defined in claim 18 in which said down tube assembly comprises a tubular portion and a flange portion connected to said tubular portion, said flange portion having a vent opening.

20. The apparatus as defined in claim 19 in which said coupler assembly includes a gas inlet and in which said valve assembly includes a gas passageway in communication with said gas inlet and in communication with said container for pressurizing the container.

* * * * *